(12) United States Patent
Matsunaga et al.

(10) Patent No.: US 9,141,274 B2
(45) Date of Patent: Sep. 22, 2015

(54) IMAGE DISPLAYING DEVICE, AND METHOD AND COMPUTER READABLE MEDIUM FOR THE SAME

(75) Inventors: Keiichi Matsunaga, Aichi (JP); Tatsuya Sato, Aichi (JP)

(73) Assignee: BROTHER KOGYO KABUSHIKI KAISHA, Nagoya, Aichi (JP)

(*) Notice: Subject to any disclaimer, the term of this patent is extended or adjusted under 35 U.S.C. 154(b) by 670 days.

(21) Appl. No.: 12/170,839

(22) Filed: Jul. 10, 2008

(65) Prior Publication Data

US 2009/0019399 A1    Jan. 15, 2009

(30) Foreign Application Priority Data

Jul. 10, 2007    (JP) .................. 2007-180585

(51) Int. Cl.
G06F 3/0481    (2013.01)
G06F 3/0488    (2013.01)
G06F 3/0484    (2013.01)

(52) U.S. Cl.
CPC .......... *G06F 3/0488* (2013.01); *G06F 3/04817* (2013.01); *G06F 3/04847* (2013.01); *G06F 2203/04806* (2013.01)

(58) Field of Classification Search
CPC ................. G06F 3/0481; G06F 2203/04803
USPC ......................... 715/781, 788, 792
See application file for complete search history.

(56) References Cited

U.S. PATENT DOCUMENTS 6,097,389 A * 8/2000 Morris et al. ................. 715/804
6,288,702 B1 * 9/2001 Tachibana et al. ............ 345/671
6,453,078 B2 * 9/2002 Bubie et al. .................. 382/305
6,680,749 B1 * 1/2004 Anderson et al. ........ 348/231.99
6,961,908 B2 * 11/2005 Phillips ......................... 715/839

(Continued)

FOREIGN PATENT DOCUMENTS

JP    HEI 2-202766    8/1990
JP    HEI 5-188888    7/1993

(Continued)

OTHER PUBLICATIONS

Notification of Reasons for Rejection dated May 8, 2012 received from the Japanese Patent Office from related Japanese Application No. 2007-180585, together with an English-language translation.

(Continued)

*Primary Examiner* — Rashawn Tillery
(74) *Attorney, Agent, or Firm* — Scully, Scott, Murphy & Presser P.C.

(57) ABSTRACT

There is provided an image displaying device including a first display area on which thumbnail images respectively corresponding to a plurality of pieces of image data are displayed, the thumbnail images being selectable on the first display area; a second display area on which an image corresponding to one of the thumbnail images selected through the first display area is displayed; a setting unit to set an enlargement condition of the image being displayed on the second display area, the enlargement condition including an enlarging factor; a storing unit to store the enlargement condition; and a display control unit configured such that in response to selection of one of the thumbnail images, the display control unit displays the image corresponding to a selected thumbnail image in accordance with the stored enlargement condition.

9 Claims, 23 Drawing Sheets

(56) References Cited

U.S. PATENT DOCUMENTS

| | | | |
|---|---|---|---|
| 7,058,901 B1* | 6/2006 | Hafey et al. | 715/792 |
| 7,091,994 B2 | 8/2006 | Hayashi et al. | |
| 7,152,210 B1* | 12/2006 | Van Den Hoven et al. | 715/723 |
| 7,644,373 B2* | 1/2010 | Jing et al. | 715/838 |
| 7,664,739 B2* | 2/2010 | Farago et al. | 707/999.003 |
| 7,705,864 B2* | 4/2010 | Ahmed et al. | 345/667 |
| 2004/0028397 A1 | 2/2004 | Maekawa et al. | |
| 2004/0155890 A1* | 8/2004 | Andert et al. | 345/684 |
| 2004/0175764 A1 | 9/2004 | Nishiyama et al. | |
| 2004/0222942 A1 | 11/2004 | Hayashi et al. | |
| 2005/0097475 A1 | 5/2005 | Makioka et al. | |
| 2005/0134947 A1 | 6/2005 | Tsue et al. | |
| 2005/0283739 A1* | 12/2005 | Mohr et al. | 715/800 |
| 2006/0038908 A1 | 2/2006 | Yoshino | |
| 2006/0224997 A1* | 10/2006 | Wong et al. | 715/838 |
| 2007/0027994 A1 | 2/2007 | Arai et al. | |
| 2007/0055940 A1* | 3/2007 | Moore et al. | 715/738 |
| 2007/0118811 A1* | 5/2007 | Tsuchimura et al. | 715/792 |
| 2007/0186177 A1* | 8/2007 | Both et al. | 715/764 |
| 2008/0155458 A1* | 6/2008 | Fagans et al. | 715/781 |

FOREIGN PATENT DOCUMENTS

| | | |
|---|---|---|
| JP | HEI9-258709 | 10/1997 |
| JP | 2000-155788 | 6/2000 |
| JP | 2004-062839 A | 2/2004 |
| JP | 2004-213429 | 7/2004 |
| JP | 2004-227367 | 8/2004 |
| JP | 2004-252715 | 9/2004 |
| JP | 2005-91430 | 4/2005 |
| JP | 2005-184789 A | 7/2005 |
| JP | 2006-60387 | 3/2006 |
| JP | 2007-034596 A | 2/2007 |
| JP | 2007-053568 | 3/2007 |

OTHER PUBLICATIONS

Decision of Rejection dated Mar. 12, 2013 received from the Japanese Patent Office from related Japanese Application No. 2007-180585, together with an English-language translation.

Japanese Official Action dated Mar. 18, 2014 received related application JP 2013-111615.

Decision of Rejection dated Nov. 11, 2014 from related divisional Japanese Patent Application No. 2013-111615, together with an English language translation.

* cited by examiner

| IMAGE NO. | IMAGE DATA FILE | IMAGE SIZE | THUMBNAIL IMAGE DATA | DISPLAY DATA 1 | DISPLAY DATA 2 |
|---|---|---|---|---|---|
| 001 | A.pdf | 300kB | 51a | 53a | 53a1 |
| 002 | B.pdf | 300kB | 51b | | |
| 003 | C.pdf | 300kB | 51c | | |
| ... | ... | ... | ... | | |

| IMAGE NO. | IMAGE DATA FILE | IMAGE SIZE | THUMBNAIL IMAGE DATA | DISPLAY DATA 1 | DISPLAY DATA 2 |
|---|---|---|---|---|---|
| 001 | A.pdf | 300kB | 51a | 53a | 53a2 |
| 002 | B.pdf | 300kB | 51b | | |
| 003 | C.pdf | 300kB | 51c | | |
| ... | ... | ... | ... | | |

IMAGE DISPLAYING DEVICE, AND METHOD AND COMPUTER READABLE MEDIUM FOR THE SAME

CROSS-REFERENCE TO RELATED APPLICATION

This application claims priority under 35 U.S.C. §119 from Japanese Patent Application No. 2007-180585, filed on Jul. 10, 2007. The entire subject matter of the application is incorporated herein by reference.

BACKGROUND

1. Technical Field

Aspects of the present invention relate to an image displaying device having a function of displaying an image corresponding to image data.

2. Related Art

Image displaying devices configured such that an external memory medium, such as a memory card, can be detachably attachable thereto and that an image corresponding to image data stored in the external memory medium can be displayed on a display unit thereof have been widely used. Japanese Patent Provisional Publication No. 2006-60387 (hereafter, referred to as JP 2006-60387A) discloses an example of such an image displaying device. On the image displaying device disclosed in JP 2006-60387A, a user is allowed to set an enlarging factor for enlarging an image corresponding image data. When the user makes a user operation for changing onscreen representation to a next image through an operation unit, the image displaying device enlarges and displays a next image in accordance with the enlarging factor defined for the previously display image. That is, the enlarging factor previously used is maintained to enlarge and display subsequent images.

SUMMARY

However, the image displaying device disclosed in JP 2006-60387A only allows the user to change images sequentially, for example, in order in which the images are stored, and displays only one enlarged image on a display unit thereof. Therefore, if the user wants to display an enlarged image corresponding to desired image data located several pieces of image data away from the currently displayed image data, the user needs to repeat a user operation for forwarding image data several times. Such a configuration is troublesome for the user.

Aspects of the present invention are advantageous in that at least one of a method, a computer readable medium and an image displaying device capable of allowing a user to select a plurality of pieces of image data regardless of order in which the plurality of pieces of image data are stored, and simultaneously displaying, in accordance with a previously used enlarging factor, enlarged images corresponding to the plurality of pieces of image data selected by the user.

According to an aspect of the invention, there is provided an image displaying device, comprising: a first display area on which a plurality of thumbnail images respectively corresponding to a plurality of pieces of image data are displayed, the plurality of thumbnail images being selectable on the first display area; a second display area on which an image corresponding to one of the plurality of thumbnail images selected through the first display area is displayed; a setting unit configured to set an enlargement condition of the image being displayed on the second display area, the enlargement condition including an enlarging factor; a storing unit configured to store the enlargement condition; and a display control unit configured such that in response to selection of one of the plurality of thumbnail images through the first display area, the display control unit displays the image corresponding to a selected thumbnail image selected from the plurality of thumbnail images through the first display area, in accordance with the enlargement condition stored by the storing unit.

Since a newly thumbnail image selected from the first display area can be enlarged in accordance with the enlargement condition stored in the storing unit, a desired image can be enlarged in accordance with the same enlargement condition defined for the previously enlarged image. Such a configuration eliminates the need for set the enlargement condition each time a user selects a thumbnail image. It is also possible to select a desired image regardless of the order in which the image data stored. Therefore, usability in regard to selection of a desired thumbnail image can be enhanced.

According to another aspect of the invention, there is provided a computer readable medium having computer readable instruction stored thereon, which, when executed by a processor of an image displaying device, configures the processor to perform the steps of: displaying a plurality of thumbnail images respectively corresponding to a plurality of pieces of image data on a first display area; accepting selection of one of the plurality of thumbnail images through the first display area; in response to selection of one of the plurality of thumbnail images through the first display area, displaying, on a second display area, an image corresponding to a selected thumbnail image selected from the plurality of thumbnail images through the first display area, in accordance with an enlargement condition stored in the image displaying device.

Since a newly thumbnail image selected from the first display area can be enlarged in accordance with the enlargement condition stored in the storing unit, a desired image can be enlarged in accordance with the same enlargement condition defined for the previously enlarged image. Such a configuration eliminates the need for set the enlargement condition each time a user selects a thumbnail image. It is also possible to select a desired image regardless of the order in which the image data stored. Therefore, usability in regard to selection of a desired thumbnail image can be enhanced.

According to another aspect of the invention, there is provided a method to be implemented on an image displaying device, comprising the steps of: displaying a plurality of thumbnail images respectively corresponding to a plurality of pieces of image data on a first display area; accepting selection of one of the plurality of thumbnail images through the first display area; and in response to selection of one of the plurality of thumbnail images through the first display area, displaying, on a second display area, an image corresponding to a selected thumbnail image selected from the plurality of thumbnail images through the first display area, in accordance with an enlargement condition stored in the image displaying device.

Since a newly thumbnail image selected from the first display area can be enlarged in accordance with the enlargement condition stored in the storing unit, a desired image can be enlarged in accordance with the same enlargement condition defined for the previously enlarged image. Such a configuration eliminates the need for set the enlargement condition each time a user selects a thumbnail image. It is also possible to select a desired image regardless of the order in which the image data stored. Therefore, usability in regard to selection of a desired thumbnail image can be enhanced.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIGS. 7A-14B show examples of screens and coordinate tables provided while the MFP executes the enlargement and display program.

FIGS. 16A-17B show examples of screens and coordinate tables provided during execution of the enlargement process according to the second embodiment.

FIGS. 20-22 are explanatory illustrations for explaining stored contents in an input image storing area.

FIG. 24 is an explanatory illustration for explaining stored contents in the input image storing area.

DETAILED DESCRIPTION

Hereafter, embodiments according to the invention will be described with reference to the accompanying drawings.

First Embodiment

Figure 1:
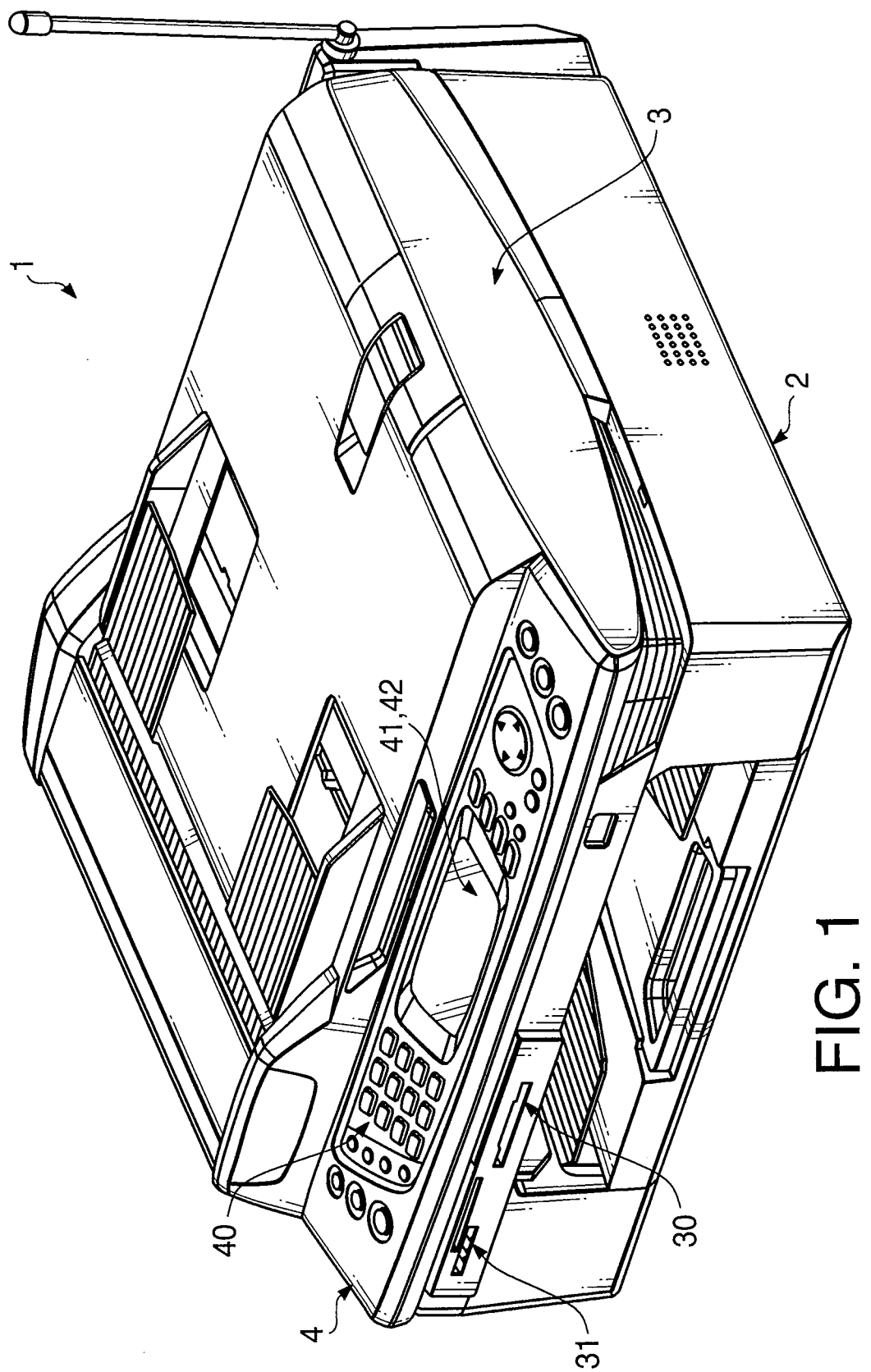
FIG. 1 is a perspective view illustrating an outer appearance of an MFP (multifunction peripheral) according to a first embodiment.

FIG. 1 is a perspective view illustrating an outer appearance of an MFP (multifunction peripheral) 1 according to a first embodiment. The MFP 1 is integrally provided with a printer unit 2 located on a lower side and a scanner unit 3 located on an upper side. The MFP 1 has a print function, a scanner function, a copying function and a facsimile function. It is noted that the MFP 1 may be configured not to have all of these functions as long as the MFP 1 has a function of displaying an image corresponding to image data inputted to the MFP 1 externally from an external memory device.

On the front side of the MFP 1, an operation panel 4 used for operating the printer unit 2 and the scanner unit 3 is provided. The operation panel 4 includes various types of operation keys 40, a touch panel 42 and a display unit 41.

In this configuration, the MFP 1 accepts a user command inputted through the operation keys 40 or the touch panel 42 and operates in accordance with the command inputted by the user. The MFP 1 is also able to receive a command transmitted to the MFP 1 from an external computer through a printer driver or a scanner driver, and to operate in accordance with the received command. On the display unit 41, various types of information including menu screens are displayed.

The touch panel 42 having the same size as that of the display unit 41 is mounted on the display unit 41. The touch panel 42 is configured to have a pair of electrode plates on which transparent electrodes are arranged in a matrix. In this configuration, when a user touches the touch panel 42 with the user's finger or a pen, the two electrodes contact with each other at the touched position and the contacted parts of the two electrodes become electrically continuous with respect to each other. Consequently, the touch panel 42 is able to locate a position at which the user touches the touch panel with a user's finger or a pen. It is noted that various types detection ways other than the above described detection way may be employed in the touch panel 42.

Under an operation panel 4, a slot unit 30 is provided. In the slot unit 30, a plurality of card slots to which a plurality of memory cards (external memory devices) are detachably attachable are provided. In the state where a plurality of memory cards are attached to the plurality of card slots, image data is read from the plurality of memory cards by a control unit 20 (see FIG. 2). On the left side of the slot unit 30, a USB terminal 31 is provided. To the USB terminal, various types of USB devices can be detachably attachable.

Figure 2:
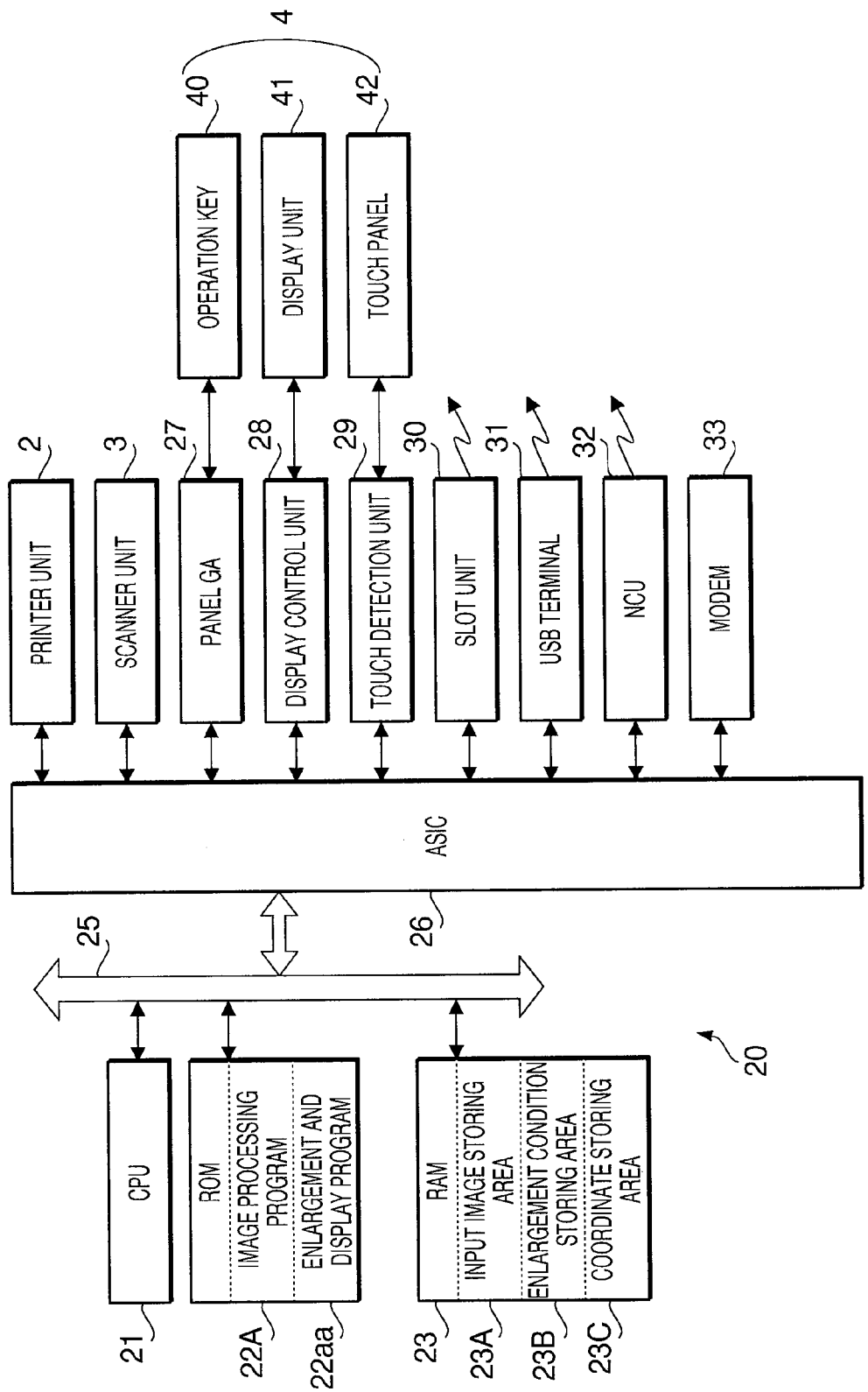
FIG. 2 is a block diagram illustrating a detailed configuration of a control unit of the MFP.

FIG. 2 is a block diagram illustrating a detailed configuration of the control unit 20 of the MFP 1. The control unit 20 has a CPU 21, a ROM 22 and a RAM 23 which may be integrated in a microcomputer chip. Further, the control unit 20 includes an ASIC (Application Specific Integrated Circuit) 26 to which the CPU 21, the ROM 22 and the RAM 23 are connected via a bus 25.

Further, the control unit 20 includes the printer unit 2, the scanner unit 4, a panel GA (Gate Array) 27, a display control unit 28, a touch detection unit 29, and the slot unit 30, the USB terminal 31, and a NCU (Network Control Unit) 32 which are connected to the ASIC 26. To the panel GA, the operation keys 40 are connected. To the display control unit 28, the display unit 41 is connected. To the touch panel detection unit 29, the touch panel 42 is connected.

The CPU 21 executes mathematical operations, information processing and control of the various components in the control unit 20 in accordance with programs stored in the ROM 22. As described in detail below, the CPU 21 loads an enlargement and display program 22aa on the RAM 23 and executes an enlargement and display process for enlarging an image corresponding to image data and displaying the enlarged image on the display unit 41.

In the ROM 22, various types of control programs including programs for implementing the print function, the scanner function, the copying function and the facsimile function, and constants and tables used for the control programs are also stored. Further, in the ROM 22, an image processing program 22A and the enlargement and display program 22aa forming a part of the image processing program 22A are stored.

When the image processing program 22A is executed by the CPU 21, the MFP 1 handles image data inputted to the MFP 1 from an external computer, a digital camera or an external memory device through the slot unit 30 or the USB terminal 31 to select image data in accordance with a user operation and to display an image corresponding to the image data.

The enlargement and display program 22aa is executed by the CPU 21 when an enlargement mode is selected by the user during execution of the image process program 22A. More specifically, when the image processing program 22A is executed by the CPU 21, the MFP 1 handles image data inputted from an external memory device to enlarge an image corresponding to image data selected by the user through a user operation and to display the enlarged image. As described later, processes shown in FIGS. 3-6 correspond to the enlargement and display program 22aa stored in the ROM 22.

The RAM 23 is used as a work memory for the CPU 21 and temporarily stores various types of data to be used for the above described programs. The RAM 23 includes an input image storing area 23A, an enlargement condition storing area 23B and a coordinate storing area 23C. In the input image storing area 23A, image data inputted to the MFP 1, for example, from an external memory device, through the slot unit 30 or the USB terminal 31 is stored. In the enlargement condition storing area 23B, an enlargement condition (including an enlargement reference position and an enlarging factor) to be used for processes based on the enlargement and display program 22aa is stored. In the coordinate storing area 23C, a table indicating a relationship between coordinates of the touch panel 42 and coordinates of the various operation keys 40 and images displayed on the display unit 41 is stored.

The ASIC 26 controls the printer unit 2 and the scanner unit 3 in accordance with instructions from the CPU 21. Various types of printing process (e.g. a laser print process) may be employed in the printing unit 2. Various types of scanning processes may be employed in the scanner unit 3.

The panel GA 27 controls the operation keys 40 used to input commands to the MFP 1. The display control unit 28 controls the onscreen representation of the display unit 41. The display control unit 28 displays various types of information concerning the functions of the MFP 1, on the display unit 41. For example, the display control unit 28 displays an image corresponding to image data read by the scanner unit 3 from a document, and displays an image corresponding to image data received from an external computer or a memory card attached to the slot unit 30, in accordance with instructions from the CPU 21.

The touch detection unit 29 operates to detect whether the touch panel 42 is touched by the user. Further, the touch panel detection unit 29 detects a position at which the touch panel 42 is touched by the user, and sends a detection signal to the CPU 21. Then, the CPU 21 executes various controls based on the table indicating a relationship between coordinates of the touch panel 42 and coordinates of images (including images of operation keys) displayed on the display unit 41. The NCU 32 and the modem 33 operate to achieve the facsimile function.

Figure 3:
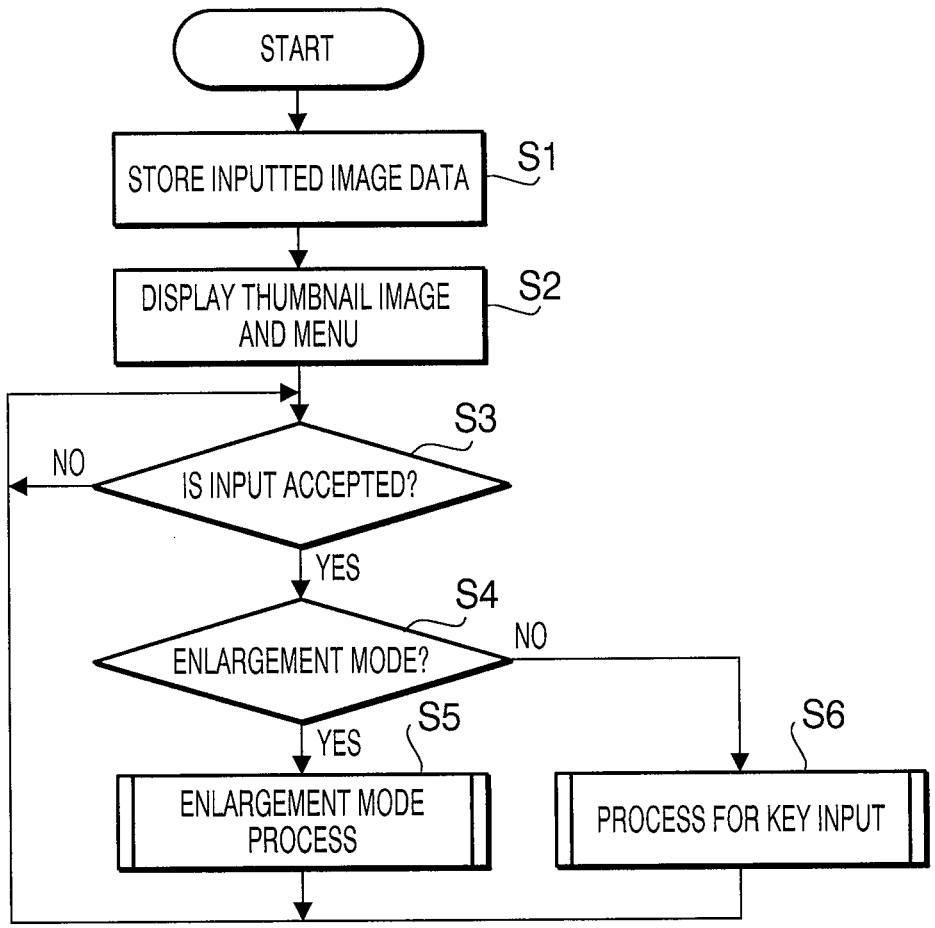
FIG. 3 is a flowchart illustrating a process to be executed by the MFP in accordance with an enlargement and display program.
Figure 4:
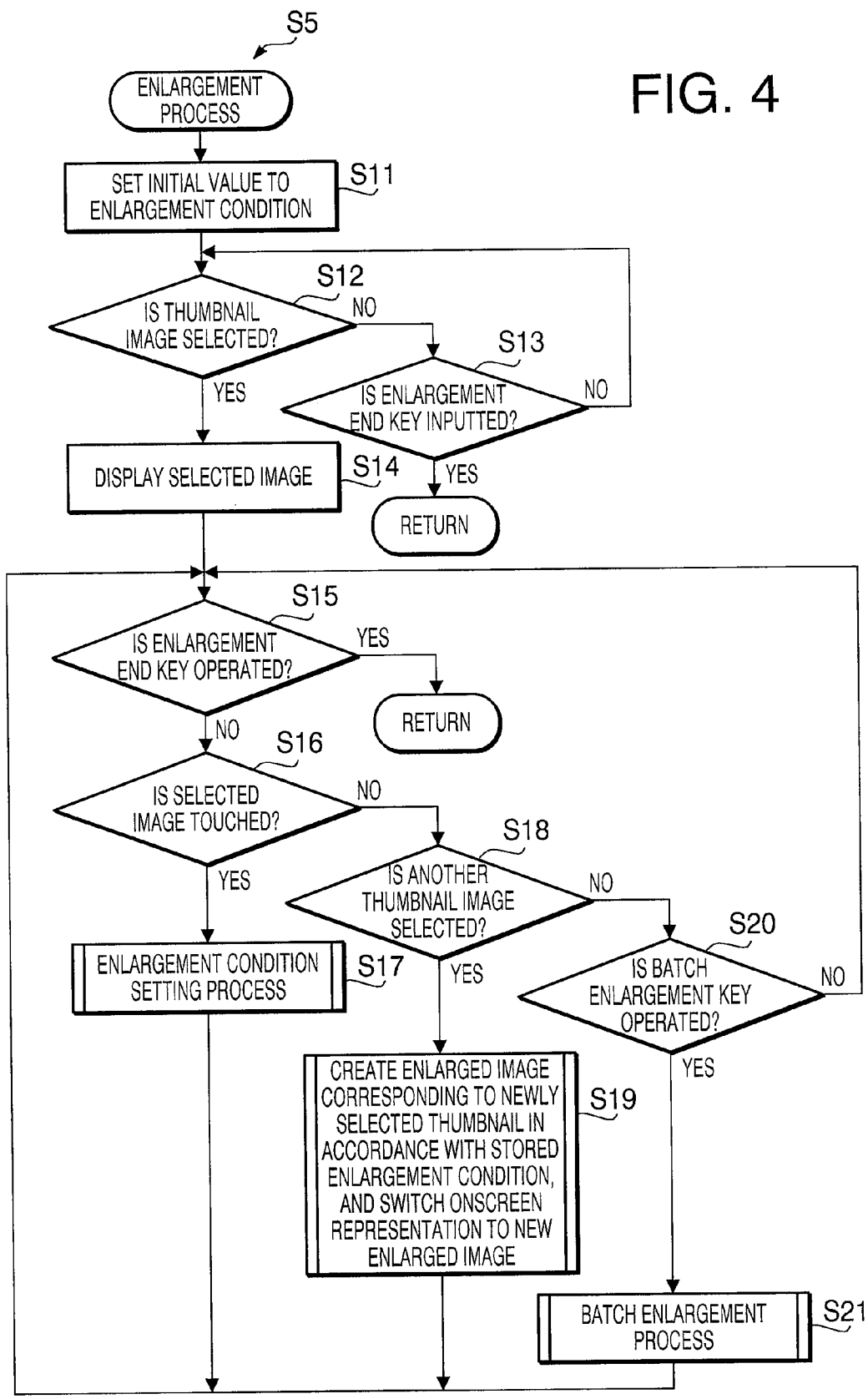
FIG. 4 is a flowchart illustrating an enlargement mode process executed by the MFP in accordance with the enlargement and display program.
Figure 5:
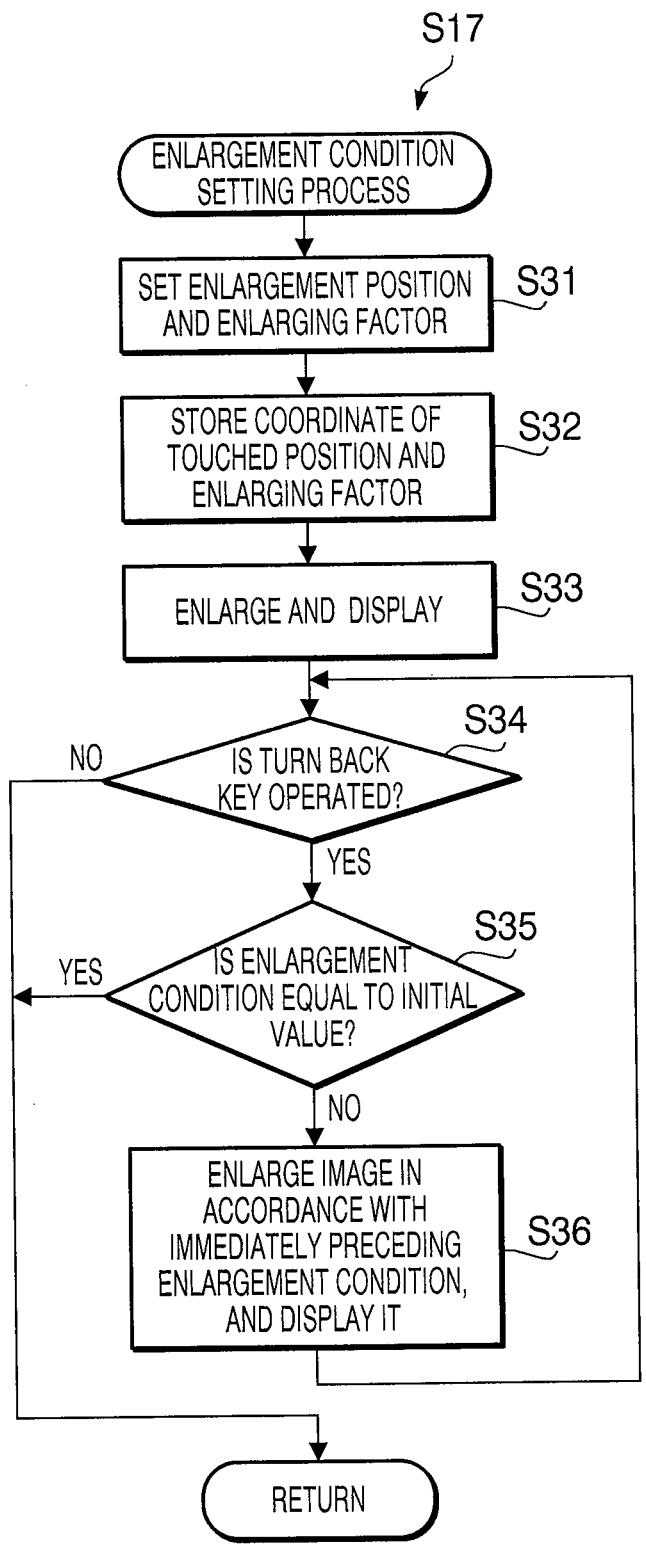
FIG. 5 is a flowchart illustrating an enlargement condition setting process executed by the MFP.
Figure 6:
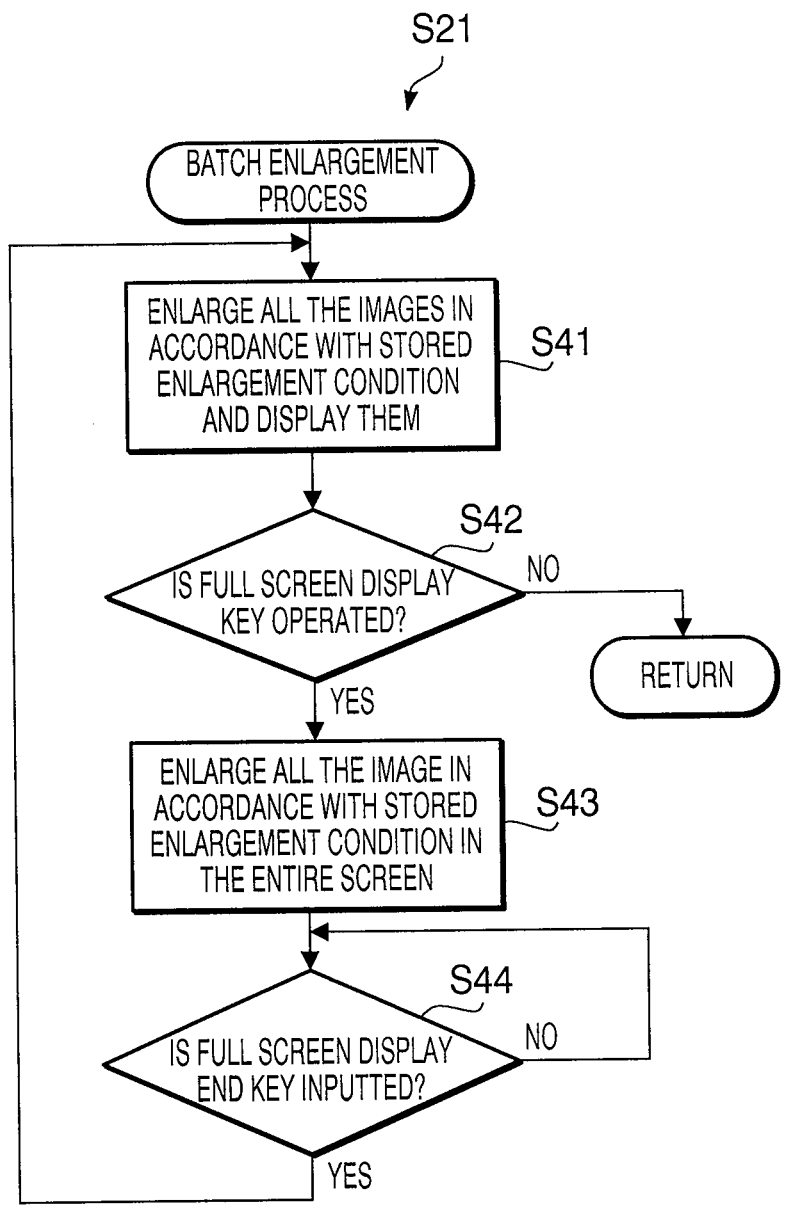
FIG. 6 is a flowchart illustrating a batch enlargement process executed by the MFP.

Hereafter, processes executed on the MFP 1 will be explained with reference to FIGS. 3-14 and FIGS. 18-23. FIG. 3 is a flowchart illustrating a process to be executed by the CPU 21 in accordance with the enlargement and display program 22aa. FIG. 4 is a flowchart illustrating an enlargement mode process executed by the CPU 21 in accordance with the enlargement and display program 22aa. FIG. 5 is a flowchart illustrating an enlargement condition setting process executed by the CPU 21 during execution of the enlargement and display program. FIG. 6 is a flowchart illustrating a batch enlargement process executed under control of the CPU 21 of the MFP 1.

Figure 18:
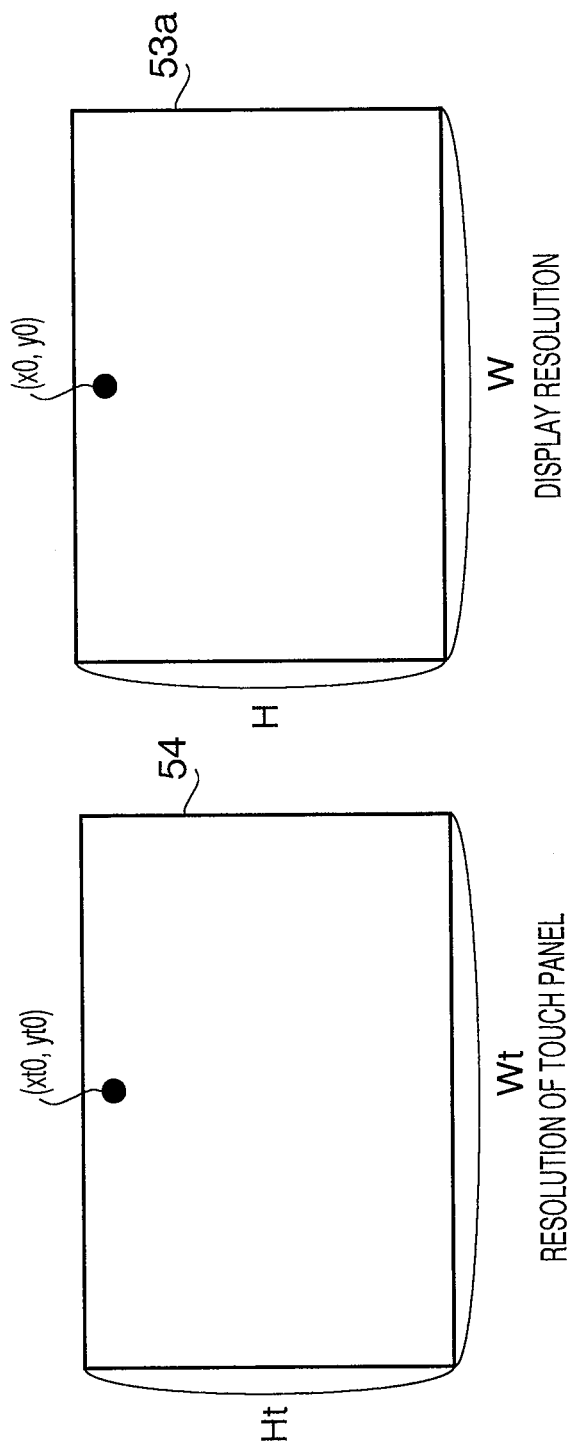
FIG. 18 is an explanatory illustration for explaining a calculation manner for converting coordinates on a touch panel.
Figure 19:
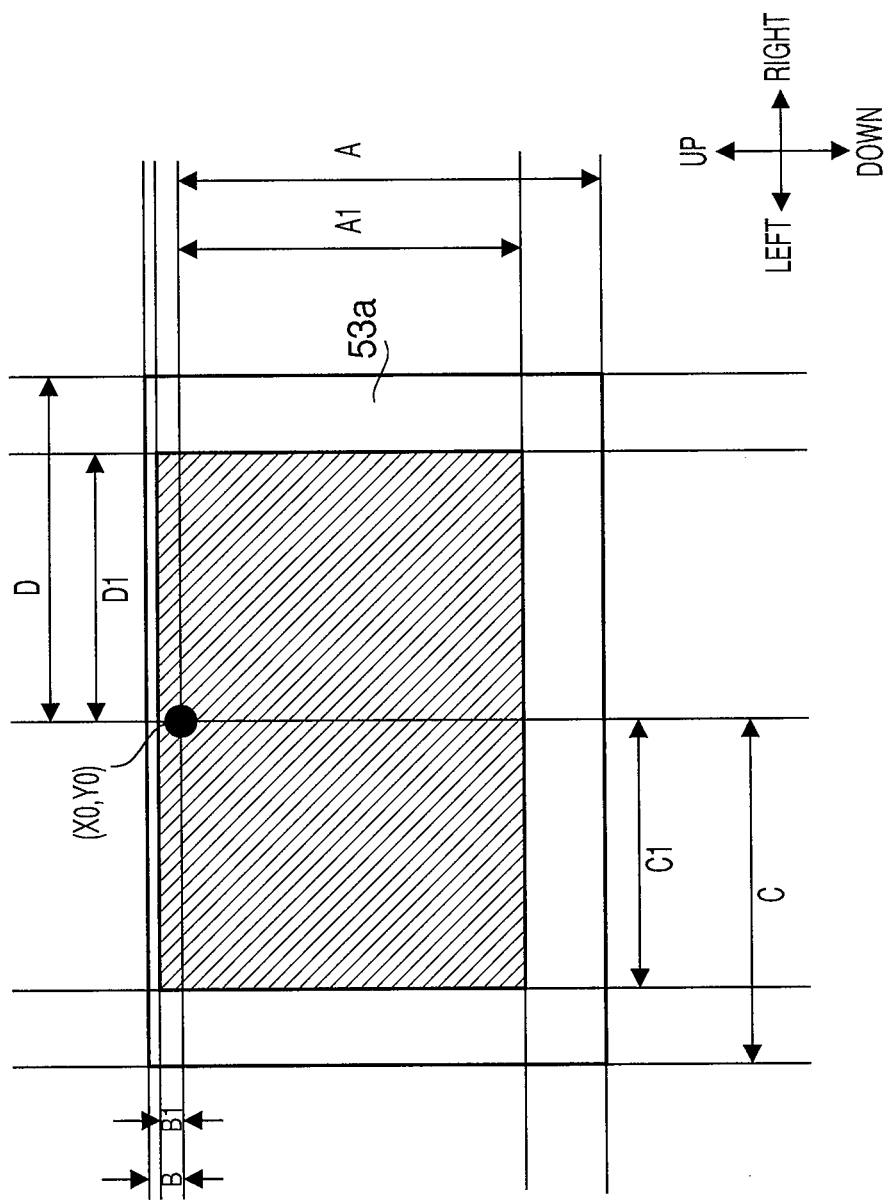
FIG. 19 is an explanatory illustration for explaining a calculation manner for calculating an area to be enlarged.
Figure 23:
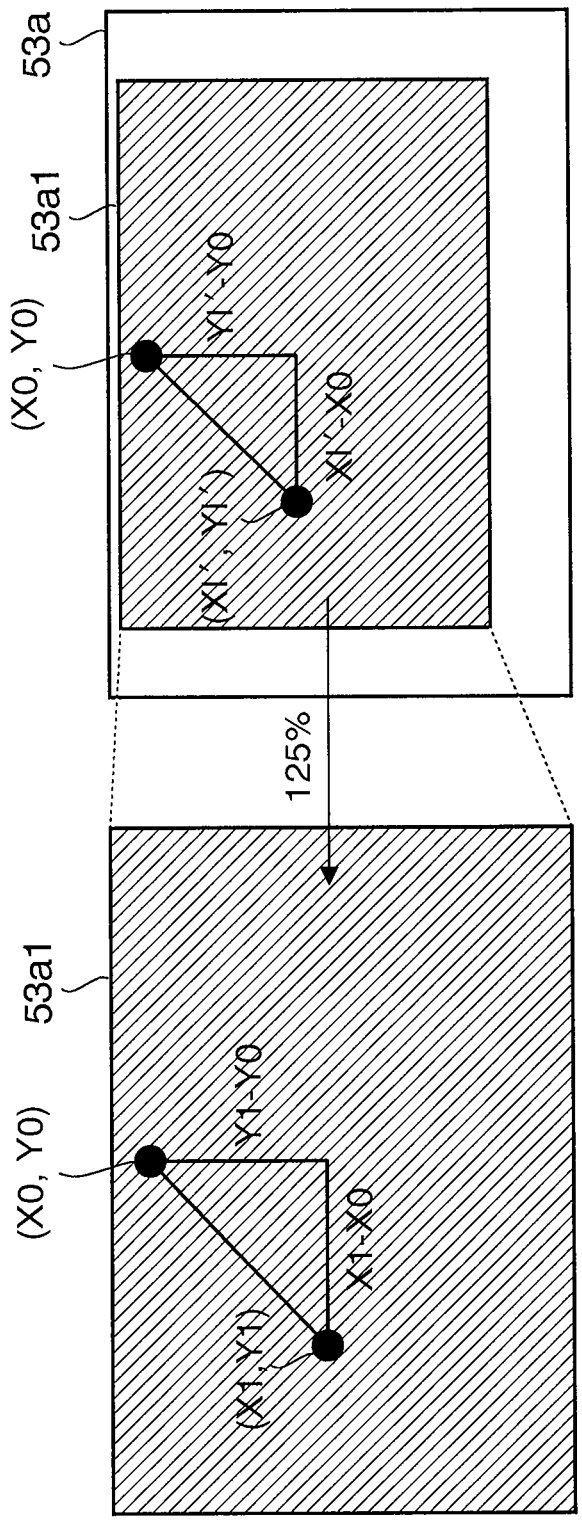
FIG. 23 is an explanatory illustration for explaining a calculation manner for conversion of coordinates.

FIGS. 7-14 show examples of screens displayed while the CPU 21 executes the enlargement and display program 22aa. FIG. 18 is an explanatory illustration for explaining a calculation manner for converting coordinates on the touch panel 42. FIG. 19 is an explanatory illustration for explaining a calculation manner for calculating an area to be enlarged in the enlargement and display program 22aa. FIGS. 20-22 and 24 are explanatory illustrations for explaining stored contents in the input image storing area 23A. FIG. 23 is an explanatory illustration for explaining a calculation manner for conversion of coordinates.

The image processing program 22A is loaded and started in response to attachment of an external memory device to the MFP 1 through the slot unit 30 or the USB terminal 31. First, the process shown in FIG. 3 is started.

When the process shown in FIG. 3 is started, the CPU 21 obtains image data, for example, from an external memory device attached to the MFP 1, and stores the obtained image data in the input image storing area 23A (step S1).

Image data has a header part (header data) and a body part. The header data includes an ID of the image data (i.e. a number assigned to image data in accordance with the order in which image data is created), size data representing the size of the mage of the image data, and thumbnail image data representing a reduced image of the image data. The header data is written to a table 81 stored in the input image storing area 23A. Although, in an example of the table shown in FIG. 20, an image data file having a PDF format is illustrated, the MFP 1 is able to handle various types of image data formats. If thumbnail image data is not added to image data, the MFP 1 may generate thumbnail image data by reducing an image of the image data.

Next, the CPU 21 displays a menu screen for allowing a user to select image processing for image data stored in the input image storing area 23A (step S2). The menu screen is configured to allow the user to select one of various types of image data processing for image data stored in the input image storing area 23A. More specifically, the menu screen includes menu items of an enlargement mode process and a print mode process for printing the image data. The coordinate storing area 23C stores a coordinate table containing the relationship between coordinates of the menu items displayed on the display unit 43 and the coordinates of the touch panel 42.

Next, the CPU 21 judges whether a user command is inputted by the user through the touch panel 42 (step S3). If no user command is inputted through the touch panel 42 (S3: NO), the CPU 21 waits until a user command is inputted.

If a user command is inputted (S3: YES), the CPU 21 judges whether the user command instructs the MFP 1 to move to an enlargement mode (step S4). More specifically, in step S4, the CPU 21 consults the coordinate table stored in the coordinate storing area 23C to judge whether the coordinate representing the touched position on the touch panel 42 is equal to the coordinate of the menu item of the enlargement mode displayed on the display unit 41.

If the CPU 21 judges that the user command instructs the MFP 1 to move to the enlargement mode (S4: YES), the MFP 1 moves to the enlargement mode (step S5). If the CPU 21 judges that the user command does not instruct the MFP 1 to move to the enlargement mode (S4: NO), the CPU 21 moves to a mode corresponding to the inputted key (step S6). For example, if the CPU 21 judges that the coordinate of the touched position on the touch panel 42 equal to the coordinate of the menu item of the print mode, the MFP 1 moves to the print mode.

When the MFP 1 moves to the enlargement mode (S5), the enlargement and display program 22aa is executed. Then, the CPU 21 starts a process based on the enlargement and display program 22aa, and displays a screen shown in FIG. 7A. More specifically, the CPU 21 displays thumbnail images 51 (51A, 51B, 51C, ... ), a thumbnail image display area 52, a selection screen 53, a selected image display area 54, a enlarging factor display area 55, a enlargement end key 56, a batch enlargement key 57 on the display unit 41.

As described above, the CPU 21 creates a coordinate table representing the relationship between the coordinates of the various keys and images displayed on the display unit 41 and the coordinates on the touch panel 42, and stores the coordinate table in the coordinate storing area 23C. FIG. 7B shows a coordinate table 91 representing the coordinates of the various keys and images displayed on the display unit 41. For example, if the touched position on the touch panel 42 is within the range of the coordinates (x1, y1)-(x2, y2), the CPU 21 judges that an enlargement end key 56 is operated by the user. Thus, the CPU 21 identifies the key or the image touched by the user based on the coordinate table, in response to the input of the user command through the touch panel 42.

In the thumbnail image display area 52, thumbnail images 51 (51A, 51B, 51C, ... ) are displayed. In FIG. 7A, the thumbnail image display area 52 is formed to be capable of displaying nine thumbnail images. However, it is noted that the number of thumbnail images displayed on the display unit 41 is not limited to the example shown in FIG. 7A. The MFP 1 may be configured to allow the user to set the number of thumbnail images displayed on the display unit 41. The MFP 1 may provide a scroll bar in the thumbnail image display area 52 so that thumbnail images which can not be included in the thumbnail image display area 52 can be displayed in the thumbnail image display area 52 by scrolling.

Figure 20:
Figure 21:

Each of the thumbnail images 51 (51A, 51B, 51C, ... ) is displayed in accordance with thumbnail image data added to the corresponding image data stored in the input image storing area 23A. As shown in FIG. 20, each of pieces of thumbnail image data is associated with the corresponding image data in the table 81.

In the selected image display area 54, a selected image 53 is displayed. In FIG. 7A, the size of the thumbnail image display area 52 and the size of the selected image display area 54 are substantially equal to each other. However, the relationship between the sizes of the thumbnail image display area 52 and the selected image display area 54 is not limited to the example shown in FIG. 7A. One of the thumbnail image display area 52 and the selected image display area 54 may be larger than the other of the thumbnail image display area 52 and the selected image display area 54. The MFP 1 may form the screen show in FIG. 7A to allow the user to set the sizes of thumbnail image display area 52 and the selected image display area 54.

The selected image 53 is based on the image data corresponding to the thumbnail image 51 selected by the user from among the thumbnail images displayed on the thumbnail image display area 52. Therefore, in the state where the user has not selected one of the thumbnail images 51 in the thumbnail image display area 52, no image is displayed in the selected image display area 54. If the thumbnail image 51A is selected by the user as illustrated in FIG. 7A, display data 53a is created from the image data "A.pdf" (see FIG. 20), and the selected image 53 corresponding to the display data 53a is displayed in the selected image display area 54.

The term "display data" as used herein means data obtained by executing predetermined processing on image data to display the image data in the selected image display area 54. For example, as the predetermined processing, the MFP 1 processes image data in accordance with the resolution of the display unit 41 or the size of the selected image display area 54. It should be noted that the expression "a process for enlarging and displaying an image" means that the process is executed with respect to display data corresponding to the image.

As described above, an input operation conducted by the user corresponds to a user operation for touching the touch panel 42 integrally formed with the display unit 41. Further, the touch detection unit 29 detects the position at which the user touches the touch panel 42, and sends the detected position to the CPU 21. After receiving the detected position from the touch detection unit 29, the CPU 21 judges that one of the operation keys or the images displayed on the display unit 41 is operated by the user.

In the enlarging factor display area 55, an enlarging factor of the selected image 53 with respect to the selected image display area 54 is displayed. In FIG. 7A, the enlarging factor is represented as "100%". The enlarging factor of 100% means that the display data 53a is created such that the entire image of the image data "A.pdf" corresponding to the selected thumbnail image 51A is displayed in the entire selected image display area 54. The enlarging factor of 300% displayed in the enlarging factor display area 55 means that an image having the size three times as large as the selected image 53A shown in FIG. 7A is displayed.

The enlargement end key 56 is used to terminate the enlargement mode and to return to the process for image processing program 22A. The batch enlargement key 57 is used to enlarge and display all the thumbnail images 51 (51A, 51B, 51C, ... ) displayed in the thumbnail image display area 52.

Hereafter, the enlargement mode process shown in FIG. 4 is explained. The enlargement mode process is executed under control of the control unit 21 in accordance with the enlargement and display program 22aa. First, the CPU 21 assigns initial values to the enlargement condition in the enlargement condition storing area 23B (step S11). The term enlargement condition means an enlarging factor of the selected image 53 displayed in the selected image display area 54 and an enlargement reference position used as a reference position for enlarging an image.

The enlargement condition may be information including at least an enlarging factor. The enlargement condition may include information concerning setting items other than the enlarging factor and the enlargement reference position. The initial values means setting values which have been set in advance in the enlargement and display program 22aa. For example, as the initial values, 100% is assigned to the enlarging factor and "no position" is assigned to the enlargement reference position.

Next, the CPU 21 judges whether one of the thumbnail mages 51 in the thumbnail image display area 52 is selected (step S12). If the CPU 21 judges that the user has not selected one of the thumbnail images (S12: NO), control proceeds to step S13 where the CPU 21 judges whether the user operated the enlargement end key 56. If the CPU 21 judges that the user did not operate the enlargement end key 56 (S13: NO), control returns to step S12 where the CPU 21 judges again whether one of the thumbnail mages 51 in the thumbnail image display area 52 is selected. That is, the CPU repeats steps S12 and S13 until the user selects one of the thumbnail images 51 in the thumbnail image display area 52 or operates the enlargement end key 56.

If the CPU 21 judges that the user operated the enlargement end key 56 (S13: YES), the enlargement mode process terminates, and control returns to the process based on the image processing program shown in FIG. 3.

If it is judged in step S12 that one of the thumbnail images 51 in the thumbnail image display area 52 is selected through the touch panel 42 (S12: YES), control proceeds to step S14. For example, if the user touches the touch panel 42 at the position of the thumbnail image 51A, the CPU 21 judges that the thumbnail image 51A is selected, by referring to the coordinate table 91.

Next, the CPU 21 creates the display data 53a from the selected image data (e.g., the image data "A.pdf" corresponding to the selected thumbnail image 51A) such that the image corresponding to the display data 53a matches the size of the selected image display area 54. For example, if the image data "A.pdf" is selected, the display data 53a is created such that the entire image of the image data "A.pdf" is displayed in the entire selected image display area 54.

In this case, the CPU 21 adds the created display data 53a to the table 81 in association with the image data "A.pdf", and stores the table 81 in the input image storing area 23A. Then, the CPU 21 controls the display control unit 28 to display, as the selected image 53A, an image corresponding to the display data 53a in the selected image display area 54 (step S14). Consequently, the selected image 53A is displayed such that the entire image data (e.g., the image data "A.pdf") corresponding to the selected thumbnail image (e.g., the thumbnail image 51A) is displayed in the entire selected image display area 54.

Figure 8:
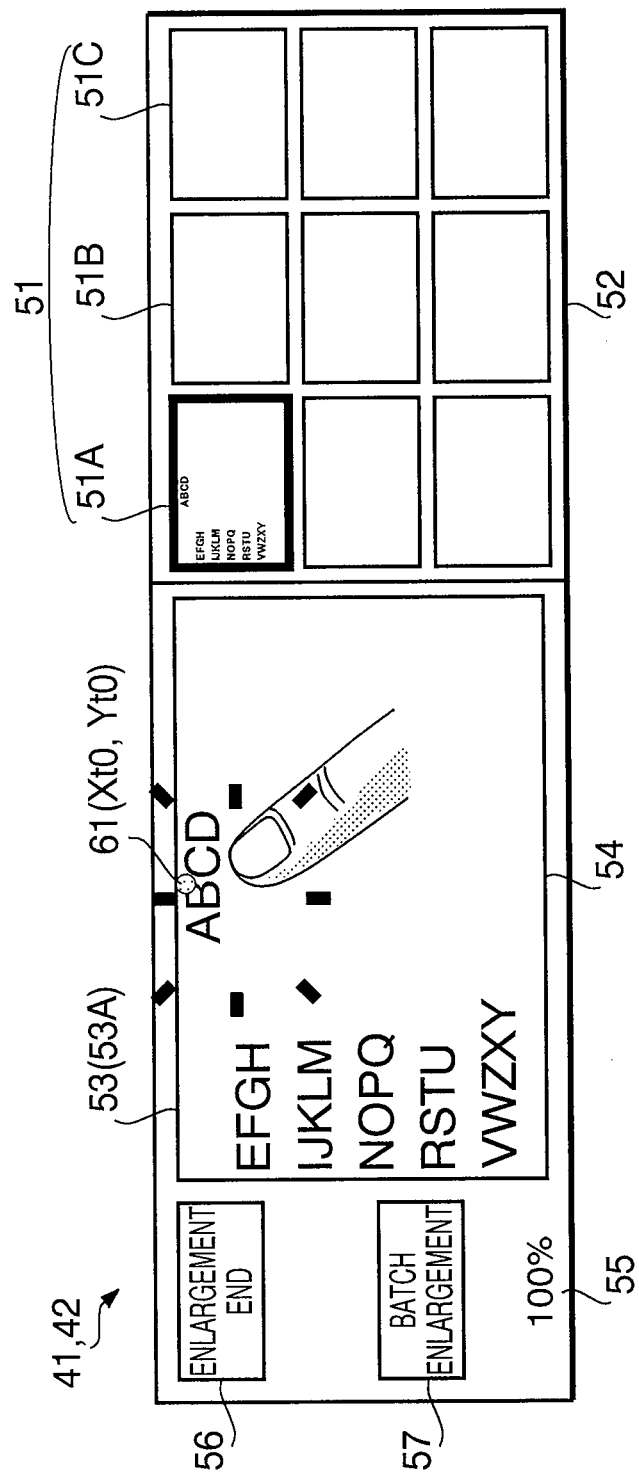
Figure 9:
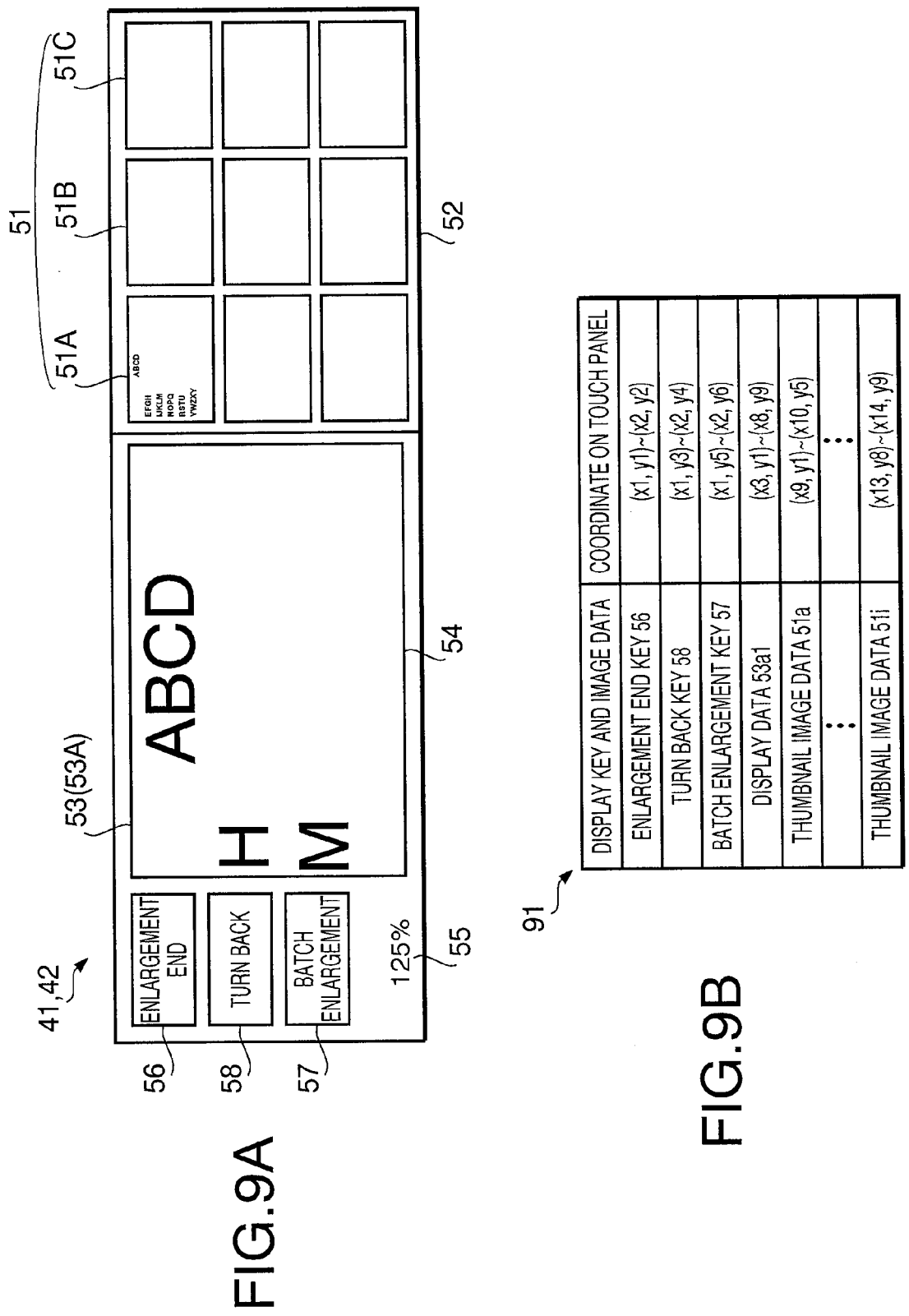
Figure 10:
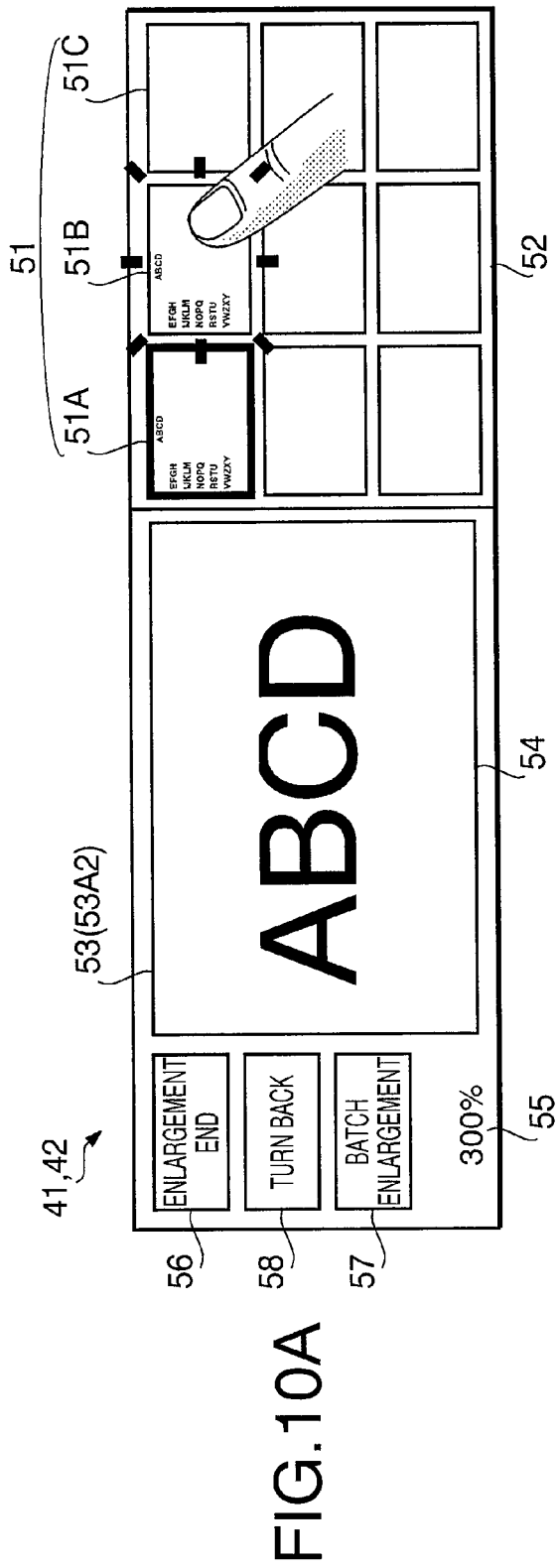
Figure 11:
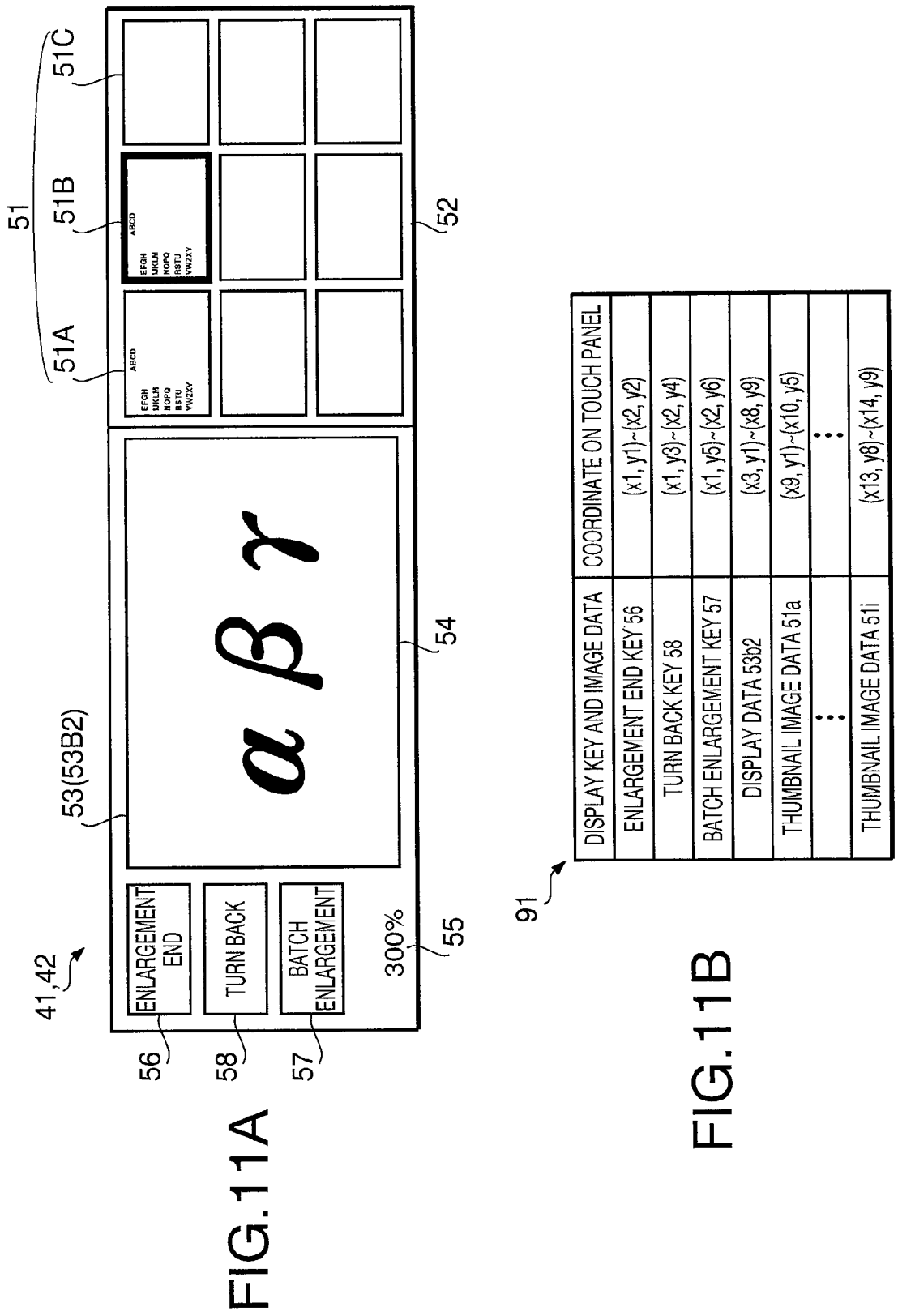

In the thumbnail image display area 52, the selected thumbnail image (e.g., the thumbnail image 51A) is displayed such that the selected thumbnail image (e.g., the selected thumbnail image 51A) is distinguishable from the other thumbnail images (not selected thumbnail images). For example, as shown in FIG. 8, a thick frame is assigned to the selected thumbnail image 51A. Through such a screen shown in FIG. 8, the user is able to quickly recognize the selected thumbnail image. To enable the user to recognize the selected thumbnail image in the thumbnail image display area 52, the selected thumbnail image may be displayed more brightly than the other thumbnail images (not selected thumbnail images).

Next, the CPU 21 judges whether the user operated the enlargement end key 56 (step S15). If the CPU 21 judges that the user operated the enlargement end key 56 (S15: YES), the enlargement mode process terminates. Then, control returns to the process based on the image processing program 22A shown in FIG. 3. If the CPU 21 judges that the user did not operate the enlargement end key 56 (S15: NO), control proceeds to step S16 where the CPU 21 judges whether the user selected the selected image 53A displayed in the selected image display area 54. If the CPU 21 judges that the selected image 53A is touched (S16: YES), control proceeds to the enlargement condition setting process (step S17).

Hereafter, the enlargement condition setting process (step S17) is explained with reference to FIG. 5. When the user touches the selected image 53A, the CPU 21 converts the coordinate (Xt0, Yt0) at which the touch panel 42 is touched into the coordinate matching the resolution of the display data 53a. In this case, if the resolution of the selected image display area 54 on the touch panel 42 is Wt, Ht, and the display resolution of the display data 53a is W, H, the CPU 21 converts the coordinate (Xt0, Yt0) of the touch panel 42 into the display coordinate (X0,Y0) in accordance with the following equations.

$$X0=Xt0(W/Wt)$$

$$Y0=Yt0(H/Ht)$$

Next, the CPU 21 assigns the display coordinate (X0, Y0) to the enlargement reference position. Further, the CPU 21 changes the enlarging factor in accordance with the number of times that the user touches the touch panel 42 (step S31). In this case, the enlarging factor is changed such that the enlarging factor increases at a predetermined step in accordance with a touching operation. For example, the enlarging factor increases at a step of 25% from the initial value of 100% (100%→125%→150% ... ).

It is noted that the manner of setting the enlarging factor and the enlargement reference position are not limited to the above described example. For example, when the state where the selected image 53 is touched continues for a relatively long time, the enlarging factor may increase gradually in accordance with the time period for which the selected image 53 is touched. Alternatively, the MFP 1 may be configured to allow the user to set the enlarging factor when the user touches the touch panel 42, and to allow the user to move the enlargement reference position when the user slides the touched position (e.g., the position touched by the user's finger) on the touch panel 42 so that the position (coordinate) at which the user releases the user's finger from the touch panel 42 is defined as the enlargement reference position.

Since in step S31 the enlargement reference position can be defined in addition to defining the enlarging factor as the enlargement condition, the user is able to enlarge the image while checking the position at which the image is enlarged. Such a configuration makes it possible to check a target image effectively.

Next, the CPU 21 stores the enlargement reference position and the enlarging factor defined as above in the enlargement condition storing area 23B (step S32). For example, the enlargement reference position of (X0, Y0) and the enlarging factor of 125% are stored in the enlargement condition storing area 23B in accordance with the touching operation conducted through the touch panel 42. In response to storing the enlargement condition, the CPU 21 also stores historical information representing previously defined enlargement condition. In this case, the initial values ("no enlargement reference position" and "the enlarging factor of 100%") are stored as the historical information.

Next, the CPU 21 enlarges and displays the display data in accordance with the enlargement condition stored in step S32. More specifically, the CPU 21 calculates an enlargement area in which an image of targeted display data should be enlarged, and displays the enlargement area in accordance with the size of the selected image display area 54. In the following, the case where the selected image 53A is enlarged in the enlarging factor of 125% with respect to the enlargement reference position of the display coordinate (X0, Y0) corresponding to the coordinate (Xt0, Yt0) of the touch panel is explained with reference to FIG. 19.

Regarding the display data 53a, the CPU 21 assigns the distance between the coordinate (X0, Y0) and the lower edge of the display data 53a, the distance between the coordinate (X0, Y0) and the upper edge of the display data 53a, the distance between the coordinate (X0, Y0) and the left edge of the display data 53a, and the distance between the coordinate (X0, Y0) and the right edge of the display data 53a to the variables A, B, C, and D, respectively.

Further, regarding the enlargement area, the CPU 21 assigns the distance between the display coordinate (X0, Y0) of the enlargement area and the lower edge of the enlargement area, the distance between the display coordinate (X0, Y0) of the enlargement area and the upper edge of the enlargement area, the distance between the display coordinate (X0, Y0) of the enlargement area and the left edge of the enlargement area, and the distance between the display coordinate (X0, Y0) of the enlargement area and the right edge of the enlargement area to the variables A1, B1, C1 and D1, respectively.

Then, the CPU 21 calculates the enlargement area so that the variables A, B, C, D, A1, B1, C1 and D1 satisfy the following relationship.

$$A:A1=B:B1=C:C1=D:D1=1:(100 \div 125)$$

Next, the CPU 21 creates display data 53a1 such that the enlargement area of the display data 53a matches the size of the selected image display area 54. In this case, the CPU 21 may execute an interpolation process to maintain the quality of the enlarged image.

Next, the CPU 21 adds the display data 53a1 to the table 81 in the input image storing area 23A while associating the display data 53a1 to the image data "A.pdf". Then, the CPU 21 displays the display data 53a1 in the selected image display area 54 as a selected image 53A1. Subsequently, the CPU 21 updates the coordinate table 91 in the coordinate storing area 23C as illustrated in FIG. 9B to assign the display data 53a1 to the range of coordinates of (x3, y1) and (x8, y9).

As illustrated as the selected image 53A1 in FIG. 9A, the CPU 21 enlarges the selected image 53A shown in FIG. 8. After the display data is thus enlarged and displayed, the CPU 21 displays a "turn back key" 58 on the display unit 41 as illustrated in FIG. 9A. The turn back key is used to display the selected image 53 in accordance with the immediately preceding enlargement condition stored in the historical data concerning the enlargement condition.

Next, the CPU 21 judges whether the user operated the turn back key 58 (step S34). If the CPU 21 judges that the user did not operated the turn back key 58 (S34: NO), the enlargement condition setting process terminates, and control returns to the enlargement mode process based on the enlargement and display program 22aa. If the CPU 21 judges that the user operated the turn back key 58 (S34: YES), the CPU 21 judges whether the current enlargement condition in the enlargement condition storing area 23B corresponds to the initial values (step S35).

If the current enlargement condition corresponds to the initial values (S35: YES), the CPU 21 terminates the enlargement condition setting process without changing the onscreen representation of the selected image, and control returns to the enlargement mode process based on the enlargement and display program 22aa. If the current enlargement condition does not correspond to the initial values (S35; NO), the CPU 21 reads the historical data concerning the enlargement condition in the enlargement condition storing area 23B, and displays the display data, in the selected image display area 54, in accordance with the immediately preceding enlargement condition of the selected image 53 (step S36).

For example, if the user operates the turn back key 58 in the state where the selected image 53A1 created in accordance with the enlargement condition (the enlargement reference position (X0, Y0) and the enlarging factor of 125%), the CPU 21 obtains the immediately preceding enlargement condition ("no enlargement reference position" and the enlarging factor of 100%) from the historical data concerning the enlargement condition.

Next, the CPU 21 reads the display data 53a corresponding to the display data 53a1 on which the selected image 53A1 is based, from the table 81 stored in the input image storing area 23A shown in FIG. 22. Then, the CPU 21 displays the selected image 53A in the selected image display area 54, in accordance with the display data 53a. It is noted that if a plurality of enlargement conditions are stored in the historical data, the CPU 51 enlarges and displays the display data 53a in accordance with the immediately preceding enlargement condition. Therefore, if the user operates the turn back key 58 repeatedly, the onscreen representation turns back until the enlargement condition turns back to the initial values.

After the enlargement condition setting process is finished, control returns to step S15 where the CPU 21 judges whether the user operated the enlargement end key 56 (see FIG. 4). If the selected image is touched again (S15: NO, S16: YES), control proceeds to the enlargement setting process again (step S17). In the following, the case where the selected mage 53A1 is touched in the state where selected image 53A1 is displayed as illustrated in FIG. 9A.

First, the CPU 21 converts the coordinate (Xt1, Yt1) of the touch panel at which the selected image 53A1 is touched, into the display coordinate (X1, Y1), in accordance with display resolution of the display data 53a1. In this case, the equations for conversion explained as above with regard to step S33 are used.

Next, as in the case of the display data 53a1, the CPU 21 reads the display data 53a associated with the image data "A.pdf", by referring to the table 81 shown in FIG. 22. Then, the CPU 21 converts the display coordinate (X1, Y1) defined in the display data 53a1 into the display coordinate (XI', YI') defined in the display data 53a. Since the display data 53a1 corresponds to the enlargement area calculated based on the enlargement condition (enlargement reference position (X0, Y0) and enlarging factor of 125%) regarding the display data 53a, the equations for the conversion are expressed as indicated below.

$$XI'=(100/125) \cdot (X1-X0)+X0$$

$$YI'=(100/125) \cdot (Y1-Y0)+Y0$$

Next, the CPU 21 assigns 150% to the enlargement factor while defining the display coordinate (XI', YI') calculated for the display data 53a as the enlargement reference position (step S31), and stores the coordinate and the enlarging factor in the enlargement condition storing area 23B (step S32). In this case, the CPU 21 stores the immediately preceding enlargement condition (enlargement reference position (X0, Y0) and enlarging factor 125%) in the historical data.

Then, the CPU 21 calculates the enlargement area for the display data 53a in accordance with the newly defined enlargement condition (enlargement reference position (XI, YI) and enlarging factor of 150%) in substantially the same manner which has been explained for step S33. More specifically, regarding the display data 53a, the CPU 21 assigns the distance between the coordinate (XI', YI') and the lower edge of the display data 53a, the distance between the coordinate (XI', YI') and the upper edge of the display data 53a, the distance between the coordinate (XI', YI') and the left edge of the display data 53a, and the distance between the coordinate (XI', YI') and the right edge of the display data 53a to the variables A, B, C, and D, respectively.

Further, regarding the enlargement area, the CPU 21 assigns the distance between the display coordinate (XI', YI') of the enlargement area and the lower edge of the enlargement area, the distance between the display coordinate (XI', YI') of the enlargement area and the upper edge of the enlargement area, the distance between the display coordinate (XI', YI') of the enlargement area and the left edge of the enlargement area, and the distance between the display coordinate (XI', YI') of the enlargement area and the right edge of the enlargement area to the variables A1, B1, C1 and D1, respectively. Then, the CPU 21 calculates the enlargement area so that the variables A, B, C, D, A1, B1, C1 and D1 satisfy the following relationship.

$$A:A1=B:B1=C:C1=D:D1=1:(100 \div 150)$$

Next, the CPU 21 creates display data such that the enlargement area of the display data 53a matches the size of the selected image display area 54. Further, the CPU 21 displays the display data in the selected image display area 54 (step S33).

In response to creation of the new display data, the CPU 21 updates the table 81. More specifically, the CPU 21 stores the new display data in association with the image data "A.pdf" in place of the display data 53a1. It is noted that the MFP 1 stores, in the table 81, display data used only for the purpose of enlarging an image so that memory space in the input image storing area 23A can be used effectively. Further, the CPU 21 updates the coordinate table 91 in response to displaying the new enlarged image.

As described above, each time the selected image 53 is touched by the user (S15: NO, S16: YES), the enlargement condition setting process (S17) is executed, and therefore the user is able to change the enlargement condition. That is, the user is able to display the selected image 53 in a desirable enlargement condition by conducting a touching operation on the selected image 53. For example, FIG. 10A illustrates a state where the enlargement condition (enlargement reference position (XII,YII) and enlarging factor of 300%) is set by the user by repeating step S17, and a selected image 53A2 corresponding to display data 53a2 generated in accordance with the enlargement condition is displayed in the selected image display area 54. In this case, in the table 81 in the input image storing area 23A, the display data 53a2 is stored in association with the image data "A.pdf". Further, in accordance with the display status of the display unit 41 illustrated in FIG. 10A, the coordinate table 91 is updated.

If the CPU 21 judges that the selected image 53 is not touched by the user (S15: NO, S16: NO), the CPU 21 judges whether another thumbnail image 51 which is different from the thumbnail image 51A displayed as the selected image 53A2 is selected from among the thumbnail images (51B, 51C . . . ) displayed in the thumbnail image display area 52 (step S18). In this case, the CPU 21 is able to derive the relationship between the position (coordinate) at which the user touches the touch panel 42 and the display position of the thumbnail image 51 displayed on the display unit 41, based on the coordinate table 91 shown in FIG. 10B. Therefore, the CPU 21 is able to judge whether another thumbnail image 51 is selected by the user.

If the CPU 21 judges that another thumbnail image 51B is selected by the user on the screen shown in FIG. 10A (S18: YES), the CPU 21 creates a selected image 53B2 by enlarging the image data "B.pdf" corresponding to the thumbnail image 51B, in accordance with the enlargement condition (enlargement reference position (XII, YII) and enlarging factor of 300%) defined for the selected image 53A2 previously displayed, and switches the onscreen representation from the selected image 53A2 to the selected image 53B2 as illustrated in FIG. 11A (step S19).

More specifically, step S19 is executed as follows in the similar manner described above with respect to step S33. First, the CPU 21 reads the image data "B.pdf" corresponding to the selected thumbnail image 51B from the input image storing area 2A (see FIG. 24). Then, the CPU 21 creates display data 53b such that the entire image of the image data "B.pdf" is displayed in the entire selected image display area 54. Next, the CPU 21 stores the display data 53b in the table 81 in association with the image data "B.pdf".

Then, the CPU 21 calculates an enlargement area of the display data 53b in accordance with the enlargement condition (enlargement reference position (XII, YII) and enlarging factor of 300%) stored in the enlargement condition storing area 23B.

Next, the CPU 21 creates display data 53b2 by enlarging the calculated enlargement area to the size of the selected image display area 54. The CPU 21 adds the display data 53b2 to the table 81 while associating the display data 53b2 with the mage data "B.pdf", and stores the table 81 in the input mage storing area 23A. Next, the CPU 21 displays a selected image 53B2 corresponding to the created display data 53b2 in the selected image display area 54 (see FIG. 11A). Further, the CPU 21 updates the coordinate table 91 in the coordinate storing area 53C by associating the display data 53b2 with the coordinate (x3, y1)-(x8, y9) of the touch panel 42 in place of associating the display data 53a2 with the coordinate (x3, y1)-(x8, y9) of the touch panel 42 (see FIG. 11B).

As described above, when another thumbnail image is newly selected, an enlarged image of the newly selected thumbnail image is displayed while maintaining the enlargement condition assigned to the enlarged image previously displayed (S119). Such a configuration eliminates the need for setting the same enlargement condition each time the user switches an image to be displayed. Consequently, usability of the MFP 1 can be enhanced.

Since the process of step S19 is executed for the display data 53b created from the image data "B.pdf" corresponding to the newly selected thumbnail image 51B, it is possible to execute the enlarging operation with respect to the same center position even if a property (e.g., the resolution or the size of an image) of the image data "B.pdf" is different from a property (e.g., the resolution or the size of an image) of the "A.pdf".

After the selected image 53B is displayed, control returns to step S15 where the CPU 21 judges whether the user operated the enlargement mode termination key 56. That is, each time the user selects another thumbnail image which is different from the currently selected thumbnail image displayed as the selected image 53, from among the thumbnail images displayed in the thumbnail image display area 52 (S15: NO, S16: NO and S18: YES), the CPU 21 enlarges the newly selected thumbnail image in accordance with the enlargement condition stored in the enlargement condition storing area 23B, and displays the enlarged image. That is, the CPU 21 replaces the selected image 53 previously displayed with the newly enlarged image.

Figure 12:
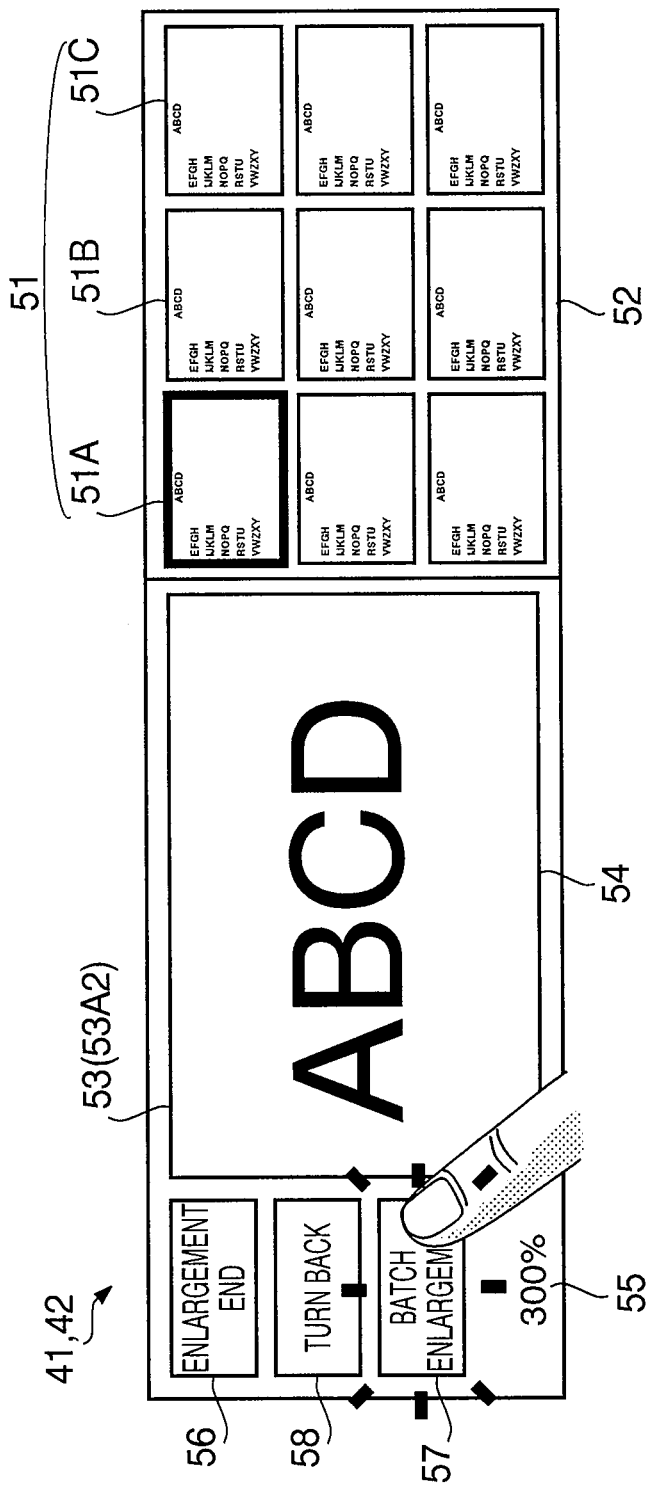
Figure 13:
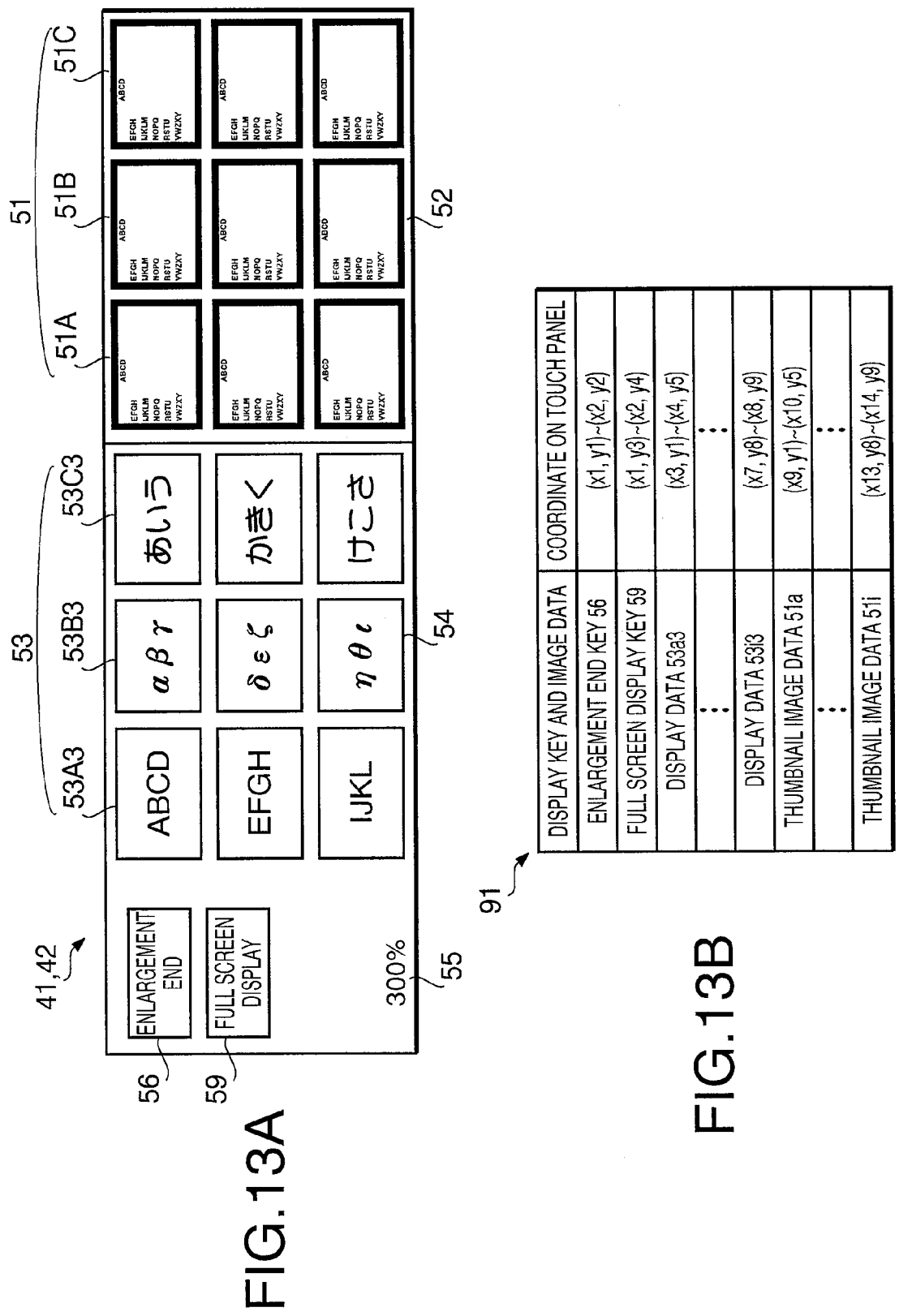

If the CPU 21 judges that another thumbnail image is not selected (S18: NO), control proceeds to step S20 where the CPU 21 judges whether the user operated the batch enlargement key 57. If the user operated the batch enlargement key 57 as illustrated in FIG. 12 (S20: YES), a batch enlargement process is executed (step S21).

Figure 7:
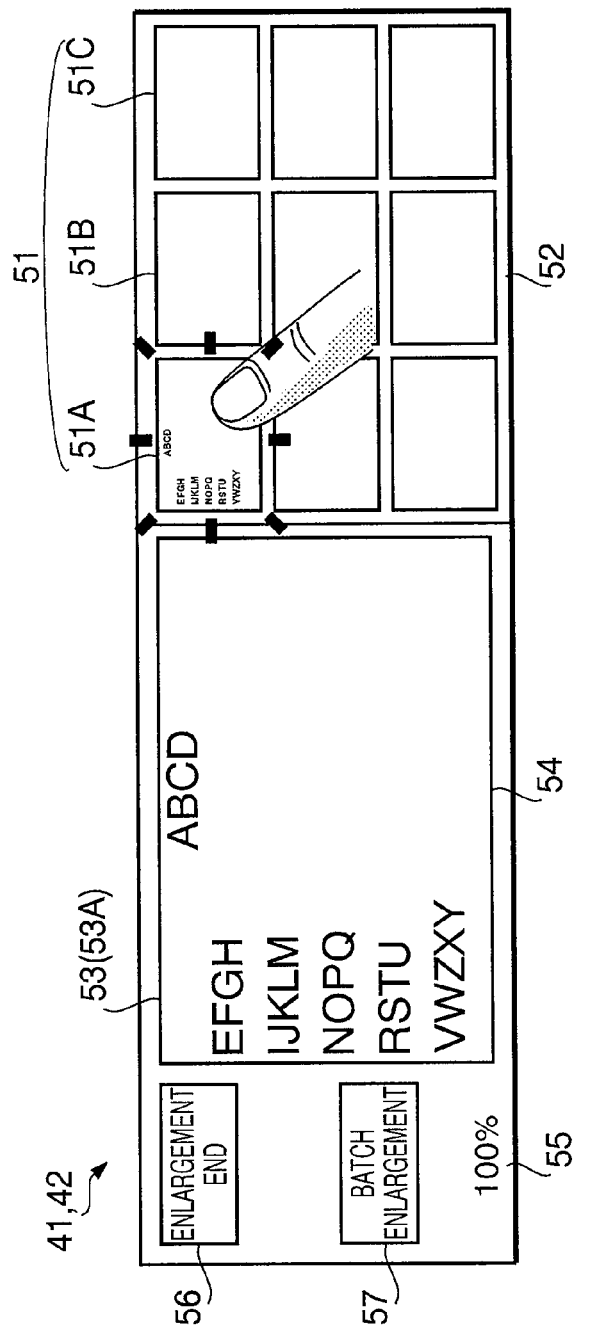

Hereafter, the batch enlargement process is explained with reference to FIG. 7. First, the CPU 21 selects all of the thumbnail images 51 (51A, 51B, 51C . . . ) displayed in the thumbnail image display area 52. Then, the CPU 21 enlarges and displays the image data corresponding to each of the thumbnail images 51 (51A, 51B, 51C . . . ) in accordance with the enlargement condition stored in the enlargement condition storing area 23B (e.g., enlargement reference position (XII, YII) and enlarging factor of 300% illustrated in FIG. 10A).

The enlarging operation is executed in the similar manner explained with reference to step S13. More specifically, the CPU 21 creates display data (53a, 53b, 53c, . . . ) such that the entire image of the image data ("A.pdf", "B.pdf", "C.pdf") is displayed in the entire selected image display area 54, it should be noted that if display data is already stored in the input image storing area 23A, creation of such display data can be omitted. Further, the CPU 21 adds the display data 53a, 53b, 53c . . . in the table 81 while associating the display data 53a, display data 53b, display data 53c . . . with the image data "A.pdf", "B.pdf", "C.pdf" . . . , respectively. Then, the CPU 21 stores the table 81 in the input image storing area 23A.

Next, the CPU 21 calculates an enlargement area for the display data 53a, 53b, 53c . . . in accordance with the enlargement condition (e.g., enlargement reference position (XII, YII) and enlarging factor 300%). In this case, substantially the same calculation manner as that of step S33 can be used. Next, the CPU 21 divides the selected image display area 54 into a plurality of areas, the number of which is equal to the number of selected thumbnail images. For example, in this case, the selected image display area 54 is divided into nine areas.

Then, the CPU 21 creates display data 53a3, 53b3, 53c3 . . . by enlarging each of the calculated enlargement areas to the size of each divided area. Further, the CPU 21 adds the display data 53a3, 53b3, 53c3 . . . to the table 81 in the input image storing area 23A while associating the display data 53a3, display data 53b3, display data 53c3, . . . with the image data "A.pdf", "B.pdf", "C.pdf", respectively.

Next, the CPU 21 displays selected images 53A3, 53B3, 53C3, . . . respectively corresponding to the display data 53a3, display data 53b3, display data 53c3, . . . in the divided areas in the selected image display area 54, respectively. That is, the divided areas are assigned to the selected images 53A3, 53B3, 53C3 . . . , respectively.

As described above, in step S41, all of the selected images 53 respectively corresponding to all the thumbnail images displayed in the thumbnail image display area 52 can be enlarged and displayed in accordance with the same enlargement condition previously defined. Such a configuration makes it possible to make a comparison between all of the enlarged images (the selected images 53). Since the fixed enlargement reference position is applied for all of the selected images 53, the comparison can be performed for the same portion in each of the enlarged images which are enlarged in accordance with the same enlargement condition.

Through step S41, the CPU 21 updates the coordinate table 91 as illustrated in FIG. 13B. That is, the CPU 21 assigns respective coordinates on the touch panel 42 to the display data 53a3, display data 53b3, display data 53c3, . . . .

Through step S41, the CPU 21 displays a full screen display key 59 on the display unit 41 as illustrated in FIG. 13A. The full screen display key 59 is used to display all of the selected images 53 (53A3, 53B3, 53C3, . . . ) in a display area 62 corresponding to the sum of the thumbnail image display area 52 and the selected image display area 54.

Then, the CPU 21 judges whether the user operated the full screen display key 59 (step S42). If the CPU 21 judges that the user did not operate the full screen display key 59 (S42: NO), the batch enlargement process terminates, and then control returns to the enlargement mode process based on the enlargement and display program 22a.

If the CPU 21 judges that the user operated the full screen display key 59 (S42: YES), the CPU 21 divides the display area 62 corresponding to the sum of the thumbnail image display area 52 and the selected image display area 54 into a plurality of areas (e.g., nine areas), the number of which corresponds to all the thumbnail images in the thumbnail image display area 52.

Next, the CPU 21 creates display data (53a4, 53b4, 53c4, . . . ) such that each of the display data 53a3, display data 53b3, display data 53c3, . . . is displayed in the entire region of the corresponding divided area. Based on the display data 53a4, 53b4, 53c4, . . . , the CPU 21 displays the selected images 53A4, 534, 53C4, . . . (step S43). It is understood that each of the selected images 53A4, 53B4, 53C4 . . . is larger than the corresponding one of selected images 53A3, 53B3, 53C3, . . .

By thus executing step S43, it is possible to allow the user to make a comparison between the selected images corresponding to the thumbnail images more comfortably. In this case, each of the selected images 53 can be displayed in a size larger than or equal to a predetermined size. Such a configuration also makes it possible to easily make a comparison between the selected images.

Further, the CPU 21 displays the selected images 53 (53A4, 53B4, 53C4, . . . ) in the display area 62, and updates the coordinate table 91. That is, the CPU 21 assigns coordinates on the touch panel 42 to the display data 53a4, display data 53b4, display data 53c4, . . . , respectively.

Further, the CPU 21 displays the selected images 53 (53A4, 53B4, 53C4, . . . ) in the display area 52, and displays a full screen display end key 60 on the display unit 41. The full screen display end key 60 is used to terminate displaying of the selected images 53 (53A4, 53B4, 53C4, . . . ) in the display area 62, and to turn back to the onscreen representation where the selected images 53 are displayed in the selected image display area 54 as illustrated in FIG. 13A.

Figure 14:
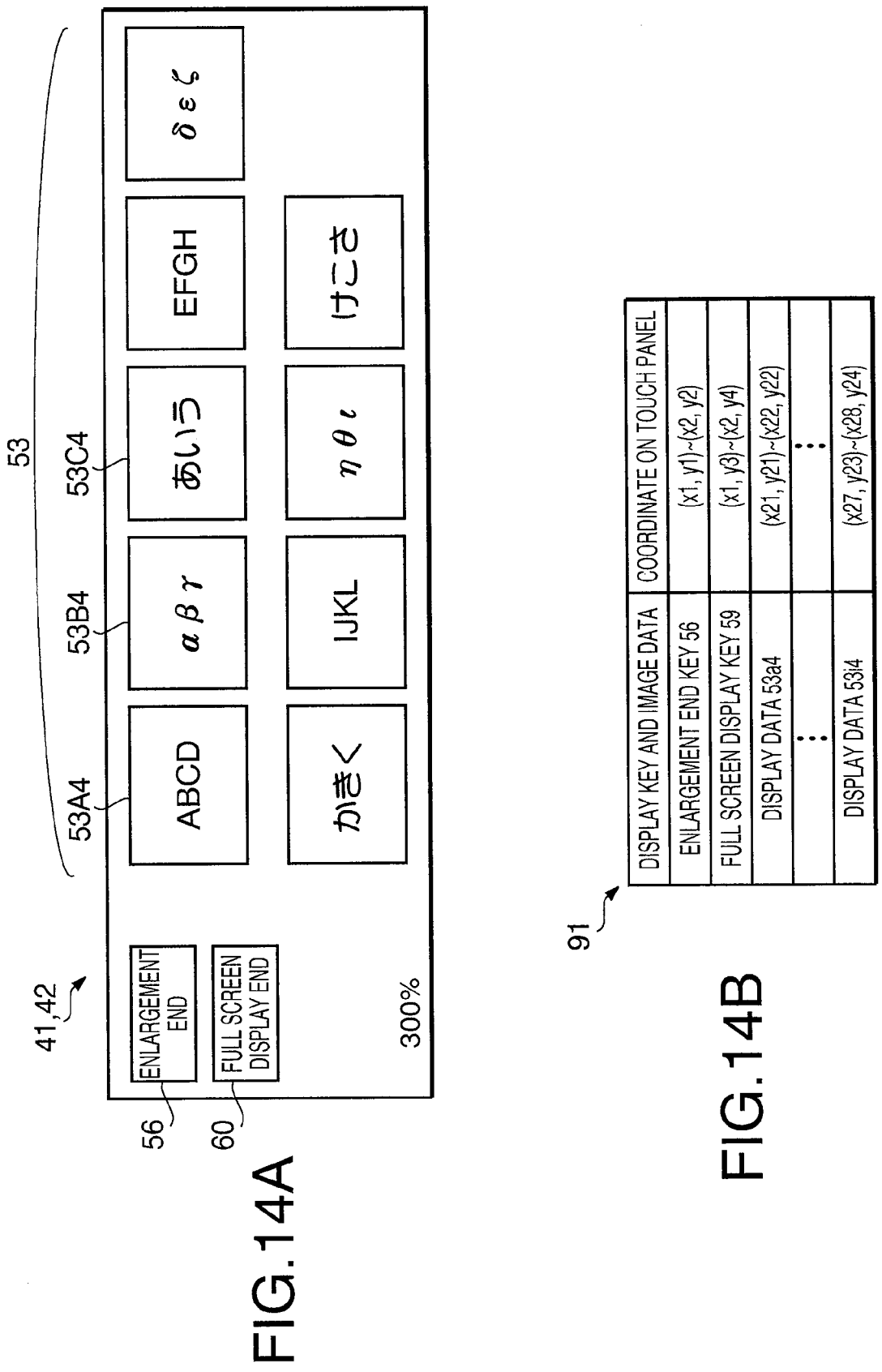

Next, the CPU 21 judges whether the user operated the full screen display end key 60 (step S44). If the CPU 21 judges that the user did not operate the full screen display end key 60 (S44: NO), the CPU 21 waits until the user operate the full screen display end key 60. If the user operated the full screen display end key 60 (S44: YES), the CPU 21 turns the onscreen representation back to the display state where the selected images 53 (53A3, 53B3, 53C3, . . . ) are displayed in the selected image display area 54 (step S41). It should be noted that the batch enlargement process may be configured such that when the batch enlargement key 57 is operated by the user, the MFP 1 moves to the display state where the selected images are displayed in the display area 62 (as illustrated in FIG. 14) without moving to the display state where the selected images 53 are displayed in the selected image display area 54.

After the batch enlargement process (S21) is thus finished, control returns to the enlargement mode process (FIG. 4) based on the enlargement and display program 22aa to judge whether the user operated the enlargement end key 56 (step S15). At this state, if the user selects one of the selected images 53 displayed in the selected image display area 54, control proceeds to the enlargement condition setting process (step S17). It is noted that if the user selects one of the selected images 53 displayed in the selected image display area 54 after the batch enlargement process is finished, the CPU 21 may remove the selected images 53 (53A3, 53B3, 53C3, . . . ) from the selected image display area 54 and display one of the selected images 53 selected by the user in the entire selected image display area 54. With this configuration, it is possible to secure a relatively large display area for a target selected image 53 targeted for setting of the enlargement condition and to allow the user to set the enlargement condition more comfortably.

It is noted that variations of the above described first embodiment are possible.

In the above described embodiment, one of the thumbnail images 51 displayed in the thumbnail image display area 52 or all of the thumbnail images 51 in the thumbnail image display area 52 are subjected to the enlargement operation. However, the enlargement operation may be configured to allow the user to designate a plurality of thumbnail images from among the plurality of thumbnail images 51 displayed in the thumbnail image display area 52 and to subject only the designated thumbnail images to the enlargement operation. In the following, such a configuration is explained as a second embodiment.

Second Embodiment

As described above, the MFP 1 according to the second embodiment has substantially the same hardware configuration as that of the first embodiment. Therefore, in the following, the drawings representing the hardware configuration of the MFP 1 are also used for the explanation of the second embodiment. In the following, the explanation focuses on features of the second embodiment.

In the second embodiment, an enlargement and display program 220a is stored in the ROM 22 in place of the enlargement and display program 22aa.

The enlargement and display program 220a is stored in the ROM 22 as a part of the image processing program 22A. When the user selects the enlargement mode in the execution of the image processing program 22A, the CPU 21 executes a process in accordance with the enlargement and display program 220a. As described in detail below, in this embodiment, The MFP 1 allows the user to designate a plurality of pieces of image data inputted from an external computer, a digital camera or an external memory device connected to the MFP 1 via the slot unit 30 or the USB terminal 31, and executes the enlargement operation for the designated plurality of pieces of image data.

Figure 15:
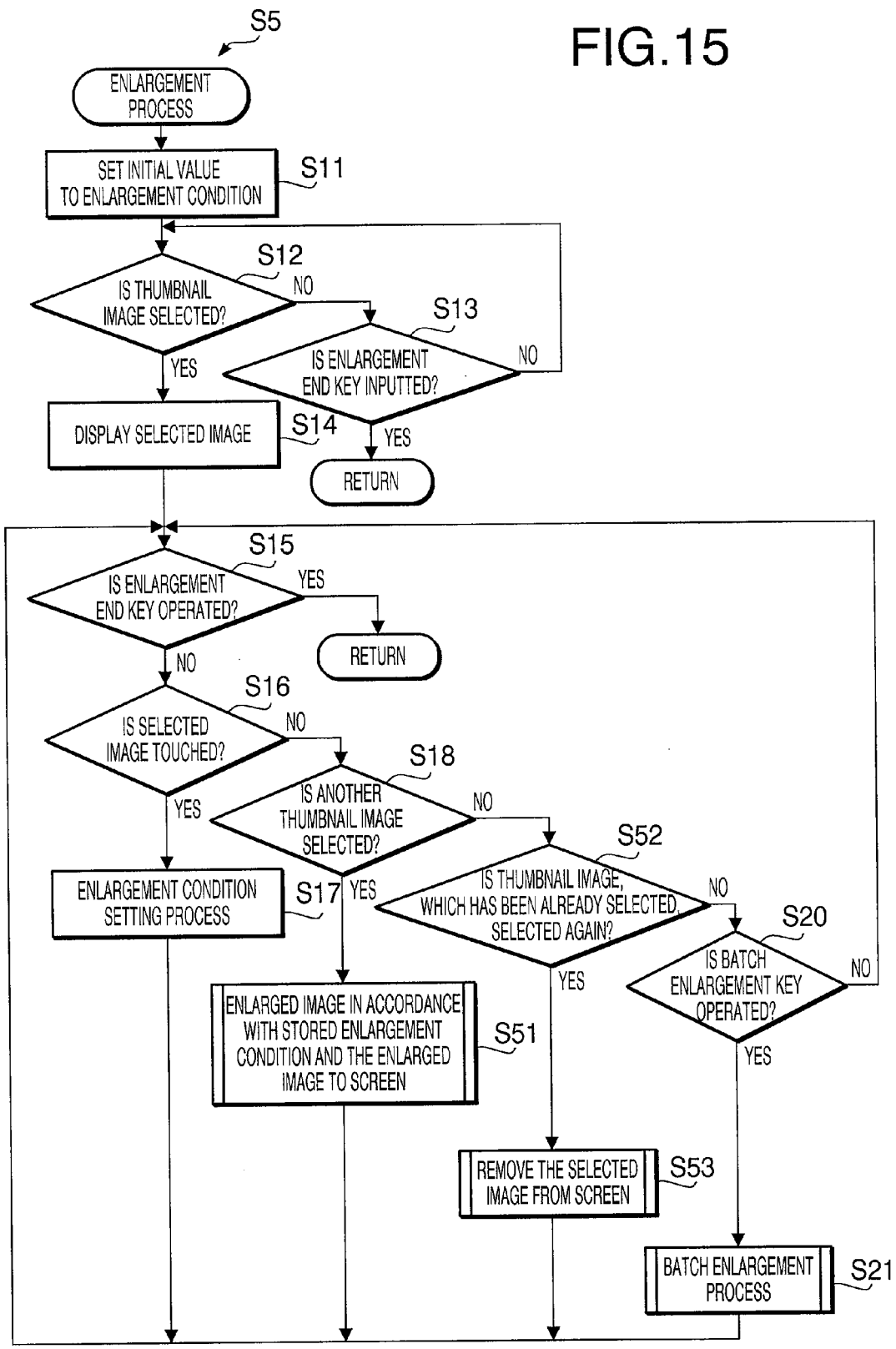
FIG. 15 is a flowchart illustrating an enlargement and display process executed by the MFP according to a second embodiment.
Figure 16:
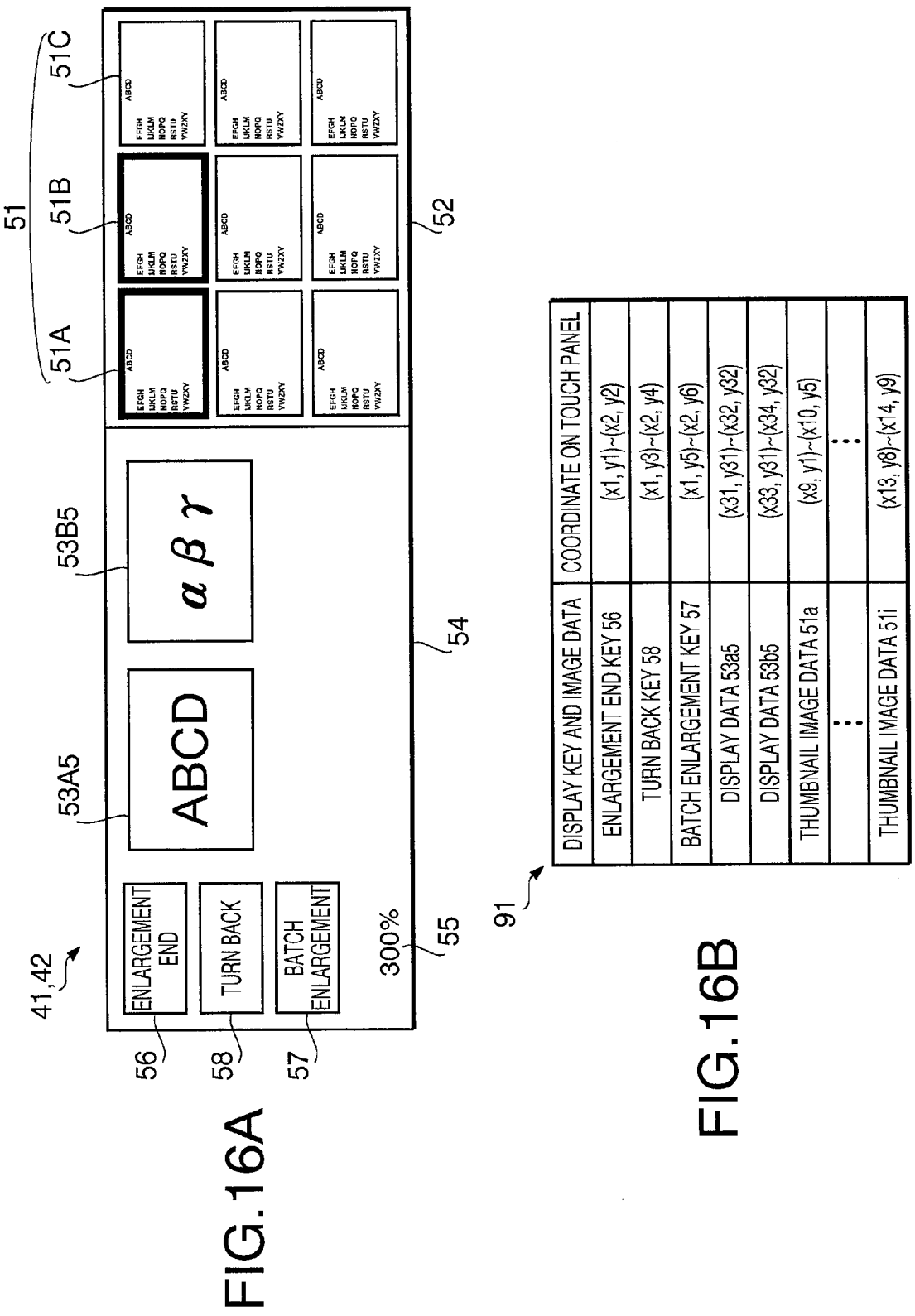
Figure 17:
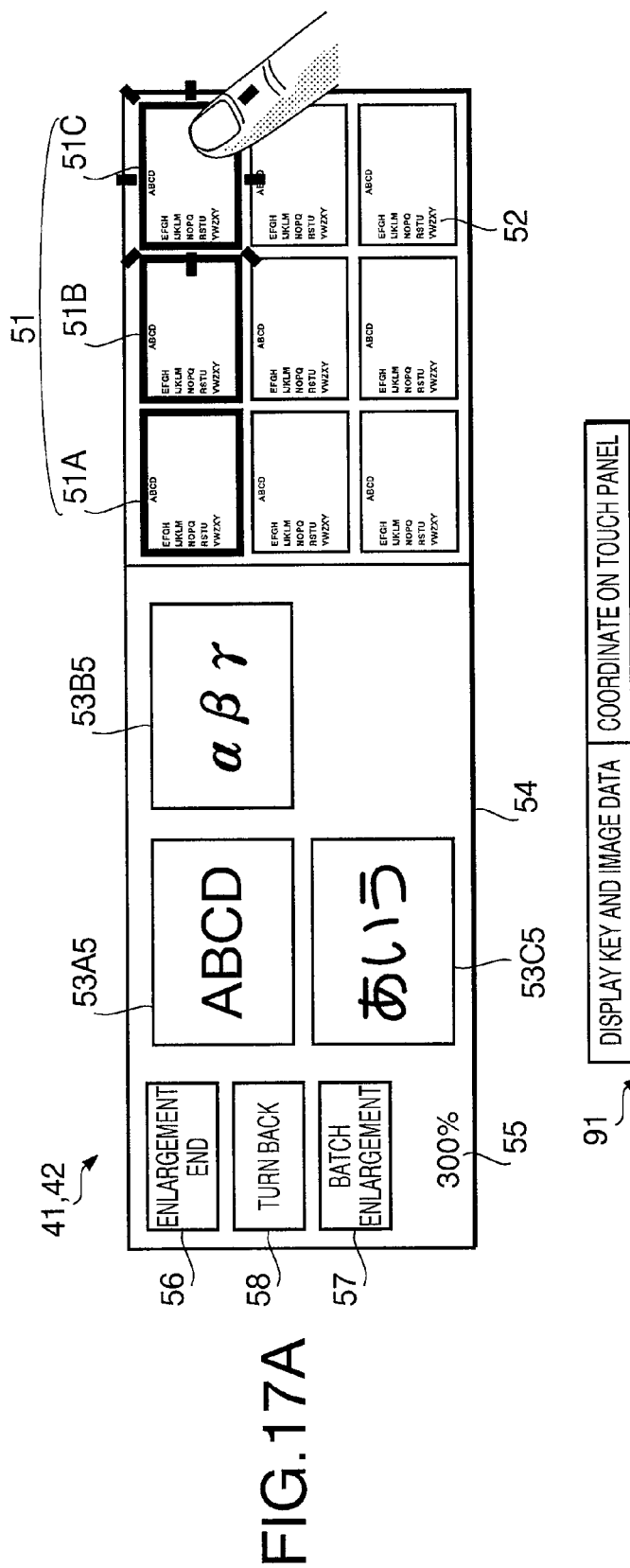

The enlargement operation including processes executed based on the enlargement and display program 220a will now be explained with reference to FIGS. 15-19. FIG. 15 is a flowchart illustrating an enlargement and display process executed under control of the CPU 21 in accordance with the enlargement and display program 220a. FIGS. 16A and 17A show examples of screens displayed on the display unit 41 during execution of the process based on the enlargement and display program 220a.

In FIG. 15, to steps which are substantially the same as those of the first embodiment (FIG. 4), the same step numbers are assigned, and explanations thereof will not be repeated.

In step S16 of FIG. 15, the enlargement condition (enlargement reference position (XII, YII) and enlarging factor of 300%) has been assigned for the thumbnail image 51A, and the selected image 53A2 (enlarged image) has been displayed on the display unit 41 as illustrated in FIG. 10A. If the CPU 21 judges that the user did not touch the selected image 53A2 (S16: NO), the CPU 21 judges whether another thumbnail image (a new thumbnail image) which is different from the thumbnail image 51A displayed as the selected image 53A2 is newly selected from among the thumbnail images 51 (51A, 51B, 51C, . . . ) displayed in the thumbnail image display area 52 (step S18).

If the CPU 21 judges that the thumbnail image 51B is newly selected (S18: YES), the CPU 21 divides the selected image display area 54 into a plurality of areas, the number of which corresponds to the number of selected thumbnail images 51A and 51B as illustrated in FIG. 16 (step S51).

More specifically, the CPU 21 creates display data 53b such that the entire image of the image data "B.pdf" corresponding to the newly selected thumbnail image 51B is displayed in the entire selected image display area 54. It is noted that if the display data 53b has been already stored in the table 81 in the input image storing area 23A, the CPU 21 does not need to create the display data 53b.

Next, the CPU 21 calculates an enlargement area of the display data 53b in accordance with the enlargement condition (enlargement reference position (XII, YII) and enlarging factor of 300%). Then, the CPU 21 creates display data 53b5 by enlarging the calculated enlargement area to the size corresponding to each of the divided selected image display areas 54. Further, the CPU 21 adds the display data 53b5 to the table 81 while associating the display data 53b5 with the image data "B.pdf".

Further, the CPU 21 reads the display data 53a2 corresponding to the selected image 53A2 already displayed in the selected image display area 54 from the table 81 in the input image display area 54. Then, the CPU 21 creates display data 53a5 by enlarging the display data 53a2 to the size of each of the divided selected image display area 54. Further, the CPU 21 adds the display data 53a5 to the table 81 while associating the display data 53a5 to the image data "A.pdf" in place of the display data 53a2.

Next, the CPU 21 displays selected images 53A5 and 53B5 respectively corresponding to the display data 53a5 and display data 53b5, in the divided selected image display areas 54, respectively, as illustrated in FIG. 16A. That is, the CPU 21 assigns the selected images 53A5 and 53B5 to the divided selected image display areas 54, respectively. Such a configuration makes it possible to enlarge and display images corresponding to a plurality of thumbnail images selected in accordance with the same enlargement condition. Consequently, it is possible to make a comparison between the plurality of enlarged images which are enlarged in accordance with the same enlargement condition.

Through step S51, the CPU 21 updates the coordinate table 91 as illustrated in FIG. 16B. That is, the CPU 21 respectively assigns the coordinates of the touch panel 42 to the display data 53a5 and the display data 53b5 which are respectively displayed in the divided selected image display areas 54.

In the second embodiment, when an another thumbnail image which is different from the thumbnail image 51A displayed as the selected image 53A2 is newly selected by the user, the selected image 53A5 and the selected image 53B5 corresponding to the newly selected thumbnail image 51B are displayed in the selected image display area 54.

By further selecting the thumbnail image 51C as illustrated in FIG. 17A (S15: NO, S16: NO, S18: YES), a selected image 53C5 created based on the enlargement condition (enlargement reference position (XII, YII) and enlarging factor of 300%) is displayed in the selected image display area 54 together with the selected images 53A5 and 53B5. Further, in accordance with the display state shown in FIG. 17A, the CPU 21 updates the coordinate table 91 as illustrated in FIG. 17B. That is, the CPU 21 respectively assigns the coordinates on the touch panel 42 to the display data 53a5, display data 53b5 and the display data 53c5 which are displayed in the divided selected image display areas 54.

In this case, the CPU 21 may arrange the selected images in the selected image display areas 54 regardless of the order in which the thumbnail images are arranged or the order in which the plurality of pieces of the image data are stored in the input image storing area 23A. After the selected image 53B is displayed in step S15, control returns to step S15 where the CPU 21 judges whether the user operated the enlargement mode termination key 56.

If the user selects one of the plurality of selected images 53 (53A5, 53B5 and 53C5) (S15: NO, S16: YES), control proceeds to the enlargement condition setting process (S17). However, the enlargement mode process may be configured such that when control proceeds to the enlargement condition setting process (S17), the CPU 21 removes the plurality of selected images 53 (53A5, 53B5 and 53C5) displayed in the selected image display area 54, and displays the one of the selected images 53 selected by the user in the entire selected image display area 54. Such a configuration makes it possible to secure a relatively large display area to be used as a target for setting the enlargement condition. Consequently, the usability is enhanced in regard to the setting of the enlargement condition.

If it is judged in step S18 that another thumbnail image 51 is not selected (S18: NO), control proceeds to step S52 where the CPU 21 judges whether the user again selected one of the thumbnail images 51 (51A, 51B, 51C) respectively corresponding to the selected images 53 (53A5, 53B5, 53C5) as illustrated in FIG. 17A. If the CPU 21 judges that one of the thumbnail images 51 (51A, 51B, 51C) respectively corresponding to the selected images 53 (53A5, 53B5, 53C5) is not selected by the user (S52: NO), the CPU 21 judges whether the user operated the batch enlargement key 57 (step S20).

If the batch enlargement key 57 is operated by the user (S20: YES), control proceeds to the batch enlargement process (step S21).

If the CPU 21 judges that one of the thumbnail images 51 (51A, 51B, 51C) respectively corresponding to the selected images 53 (53A5, 53B5, 53C5) is selected by the user (S52: YES), the CPU 21 removes the selected image 53 corresponding to the selected thumbnail image (step S53). Consider the screen where the selected images 53A5, 53B5 and 53C5 respectively corresponding to the thumbnail images 51A, 51B and 51C are displayed as illustrated in FIG. 17A. If the user selects the thumbnail image 51C, the CPU 21 removes the selected image 53C5 corresponding to the selected thumbnail image 51C, the onscreen representation moves back to the state illustrated in FIG. 16A.

As described above, when the thumbnail image corresponding to the selected image 53 which has been already displayed is selected by the user again, the selected image 53 corresponding to the selected thumbnail image is removed from the screen. Such a configuration eliminates the need for operating the MFP 1 to remove the enlarged image on the display unit 41. Therefore, the usability of the MFP 1 is enhanced.

Although the present invention has been described in considerable detail with reference to certain preferred embodiments thereof, other embodiments are possible.

In the above described first and second embodiments, the CPU 21 control the functions of the MFP 1 in accordance with user commands inputted through the touch panel 42. However, the MFP 1 may be configured to accept such user commands through the operation keys 40 or a user interface device connected to the MFP 1.

In the above described first and second embodiments, the enlargement operation is performed for image data stored in external memory devices, such as a memory card. However, the MFP 1 may perform the enlargement operation for image data read by the scanner 3 or image data received by the facsimile function.

In the above described first and second embodiments, the enlargement operations according to the embodiments is implemented on the MFP 1. However, it is noted that the enlargement operations may be implemented on various types of devices having a function of displaying image data inputted thereto (e.g., a digital camera having a display unit).

What is claimed is:

1. An image displaying device, comprising:
a first display area on which a plurality of thumbnail images respectively corresponding to a plurality of pieces of image data are displayed, the plurality of thumbnail images being selectable on the first display area;
a second display area on which an image corresponding to a part of at least one of the plurality of thumbnail images selected on the first display area is displayed on a corresponding at least one display section, a selected thumbnail image including a first part and a second part;
a setting unit configured to set an enlargement condition of the image being displayed on the second display area, the enlargement condition including an enlarging factor, the enlargement factor defining the first part and the second part to be different from each other based on a reference position selected on the second display area;
a storing unit configured to store the enlargement factor; and
a display control unit configured such that in response to a selection of a first thumbnail image of the plurality of thumbnail images on the first display area, the display control unit displays, on the second display area, an image corresponding to the first part of the selected first thumbnail image, in accordance with the enlargement factor stored by the storing unit, and does not display, on the second display area, an image corresponding to the second part of the selected thumbnail image, and
in response to a selection of a second thumbnail image of the plurality of thumbnail images on the first display area, the display control unit creates images respectively corresponding to the first parts of the first and second selected thumbnail images in accordance with the enlargement factor stored by the storing unit, displays the images corresponding to the first parts of the first and second selected thumbnail images on respective first and second display sections and does not display, on the second display area, the images corresponding to the second parts of the first and second selected thumbnail images.

2. The image displaying device according to claim 1, further comprising a selected image display control unit configured to display the plurality of thumbnail images on the first display area such that the selected thumbnail image is distinguishable from the other thumbnail images on the first display area.

3. The image displaying device according to claim 2, wherein the display control unit is configured such that, in response to an input of a predetermined user command with respect to the selected thumbnail image which is displayed by the selected image display control unit on the first display area to be distinguishable from the other thumbnail images, the display control unit removes, from the second display area, the image corresponding to the selected thumbnail image for which the predetermined user command is inputted.

4. An image displaying device, comprising:
a first display area on which a plurality of thumbnail images respectively corresponding to a plurality of pieces of image data are displayed, the plurality of thumbnail images being selectable on the first display area;

a second display area on which an image corresponding to a part of at least one of the plurality of thumbnail images selected through the first display area is displayed, a selected thumbnail image including a first part and a second part;

a setting unit configured to set an enlargement condition of the image being displayed on the second display area, the enlargement condition including an enlarging factor, the enlargement factor defining the first part and the second part to be different from each other based on a reference position selected on the second display area;

a storing unit configured to store the enlargement factor; and a display control unit configured such that in response to a selection of one of the plurality of thumbnail images through the first display area, the display control unit displays, on the second display area, an image corresponding to the first part of the selected thumbnail image, in accordance with the enlargement factor stored by the storing unit, and does not display, on the second display area, an image corresponding to the second part of the selected thumbnail image; and a selection unit configured to select more than one of the plurality of thumbnail images displayed on the first display area, wherein the display control unit is configured such that, if more than one of the plurality of thumbnail images displayed in the first display area are selected through the selection unit, the display control unit divides the second display area into a plurality of display sections in accordance with the number of the more than one of the selected thumbnail images, creates images respectively corresponding to the first parts of the more than one of the selected thumbnail images in accordance with the enlargement factor stored by the storing unit, and displays the images respectively corresponding to the first parts of the more than one of the selected thumbnail images on the plurality of display sections, respectively.

5. The image displaying device according to claim 1, further comprising a selection unit configured to select all of the plurality of thumbnail images displayed on the first display area, wherein the display control unit is configured such that, if all of the plurality of thumbnail images displayed in the first display area are selected through the selection unit, the display control unit forms a third display area by integrating the first display area and the second display area, divides the third display area into a plurality of display sections in accordance with the number of all the selected thumbnail images, creates images respectively corresponding to all the selected thumbnail images in accordance with the enlargement factor stored by the storing unit, and displays the images respectively corresponding to all the selected thumbnail images on the plurality of display sections, respectively.

6. The image displaying device according to claim 1, further comprising a display unit in which the first display area and the second display area are included.

7. A non-transitory computer readable medium having computer readable instruction stored thereon, which, when executed by a processor of an image displaying device, configures the processor to perform the steps of:

displaying a plurality of thumbnail images respectively corresponding to a plurality of pieces of image data on a first display area;

accepting selection of one of the plurality of thumbnail images on the first display area, a selected thumbnail image including a first part and a second part; and in response to a selection of a first thumbnail image of the plurality of thumbnail images on the first display area, displaying, on a second display area, an image corresponding to the first part of the selected first thumbnail image, in accordance with an enlargement factor stored in the image displaying device, the enlargement factor defining the first part and the second part to be different from each other based on a reference position selected on the second display area, and does not display, on the second display area, an image corresponding to the second part of the selected thumbnail image, and in response to a selection of a second thumbnail image of the plurality of thumbnail images on the first display area, creating images respectively corresponding to the first parts of the first and second selected thumbnail images in accordance with the enlargement factor stored by the storing unit, displaying the images corresponding to the first parts of the first and second selected thumbnail images on respective first and second display sections of the second display area and not displaying on the second display area, the images corresponding to the second parts of the first and second selected thumbnail images.

8. A method to be implemented on an image displaying device, comprising the steps of:

displaying a plurality of thumbnail images respectively corresponding to a plurality of pieces of image data on a first display area;

accepting selection of one of the plurality of thumbnail images on the first display area, a selected thumbnail image including a first part and a second part; and in response to a selection of a first thumbnail image of the plurality of thumbnail images on the first display area, displaying, on a second display area, an image corresponding to the first part of the selected thumbnail image, in accordance with an enlargement factor stored in the image displaying device, the enlargement factor defining the first part and the second part to be different from each other based on a reference position selected on the second display area, and does not display, on the second display area, an image corresponding to the second part of the selected thumbnail image, and in response to a selection of a second thumbnail image of the plurality of thumbnail images on the first display area, creating images respectively corresponding to the first parts of the first and second selected thumbnail images in accordance with the enlargement factor stored by the storing unit, displaying the images corresponding to the first parts of the first and second selected thumbnail images on respective first and second display sections of the second display area and not displaying on the second display area, the images corresponding to the second parts of the first and second selected thumbnail images.

9. The image displaying device according to claim 1, wherein the display control unit is configured such that, if more than two thumbnail images are selected from the plurality of thumbnail images on the first display area, the display control unit divides the second display area into a plurality of display sections in accordance with the number of selected thumbnail images, creates images respectively corresponding to the selected thumbnail images in accordance with the enlargement condition stored by the storing unit, and displays the images respectively corresponding to the selected thumbnail images on the plurality of display sections, respectively.

* * * * *